United States Patent [19]

Riskin

[11] Patent Number: 4,817,129

[45] Date of Patent: Mar. 28, 1989

[54] METHOD OF AND MEANS FOR ACCESSING COMPUTERIZED DATA BASES UTILIZING A TOUCH-TONE TELEPHONE INSTRUMENT

[75] Inventor: Bernard N. Riskin, Lambertville, N.J.

[73] Assignee: Telac Corp., Lambertville, N.J.

[21] Appl. No.: 22,307

[22] Filed: Mar. 5, 1987

[51] Int. Cl.$^4$ ............................................ H04M 11/08
[52] U.S. Cl. ......................................... 379/88; 379/97
[58] Field of Search ............................. 379/88, 89, 97

[56] References Cited

U.S. PATENT DOCUMENTS

| | | | |
|---|---|---|---|
| 3,614,328 | 10/1971 | McNaughton et al. | 379/88 X |
| 4,088,838 | 5/1978 | Nakata et al. | |
| 4,164,025 | 8/1979 | Dubnowski et al. | |
| 4,255,796 | 3/1981 | Gabbe et al. | |
| 4,327,251 | 4/1982 | Fomenko et al. | |
| 4,341,929 | 7/1982 | Alexander et al. | |
| 4,427,848 | 1/1984 | Tsakinikas | 379/88 |
| 4,578,540 | 3/1986 | Borg et al. | |
| 4,608,460 | 8/1986 | Carter et al. | 379/89 X |
| 4,633,041 | 12/1986 | Boivie et al. | |
| 4,649,563 | 3/1987 | Riskin | 379/97 |
| 4,650,927 | 3/1987 | James | 379/97 X |
| 4,674,112 | 6/1987 | Kondraske et al. | 379/97 X |
| 4,677,659 | 6/1987 | Dargan | 379/97 |

OTHER PUBLICATIONS

Rabiner et al., "Digital Techniques for Computer Voice Response: Implementations and Applications," *Proceedings of the IEEE*, vol. 64, No. 4, Apr. 1976, pp. 416–433.
Digital Equipment, Corp., "Straight Talk: Dectalk Speaks for Hi-Tek, Inc.", Newsletter, vol. 2, ©#3, 1985.
Smith et al., "Alphabetic Data Enty Via the Touch-Tone Pad: A Comment, " *Human Factors*, vol 13, No. (2), 1971, pp. 189–190.
Boies et al., "User Interface for Audio Communiction System," *IBM Technical Disclosure Bulletin*, vol. 25, No. 7A, Dec. 1982, pp. 3371–3377.

Primary Examiner—Keith E. George
Attorney, Agent, or Firm—Sperry, Zoda & Kane

[57] ABSTRACT

A conventional "Touch-Tone" telephone instrument is rendered functional in the same manner and to the same extent as a computer terminal having alpha-numeric capability, as regards transmission of queries directed to computerized data bases. It is also rendered functional as a recipient of information transmitted from the data base though a telephone network to provide intelligence heretofore made available only on the video screen of the computer terminal, or through automatic printers. Disclosed is the substitution of the instrument for a computer terminal and its associated video screen or teleprinter, without requirement of modification of the instrument, so that a subscriber gains from the use of the telephone functions heretofore obtainable only by providing oneself with a computer terminal and its associated screen and/or automatic printer. The user spells out one or more words by depressing the conventional alpha-numerically marked keys of a "Touch-Tone" telephone instrument. A computer to which the telephone is connected by a telephone network decodes the numeric sequence represented by depressing keys needed to spell out the selected word or words. The computer then provides an oral response transmitted through the telephone receiver to the caller, as audible intelligence. The disclosed system interacts with the user field by field and within each field, letter by letter, enabling the user to enter only the minimum number of digits required to identify accurately a target data base entry.

8 Claims, 12 Drawing Sheets

TELEPHONE NETWORK, ACCESS PROCESSORS AND DATA BASE COMPUTER

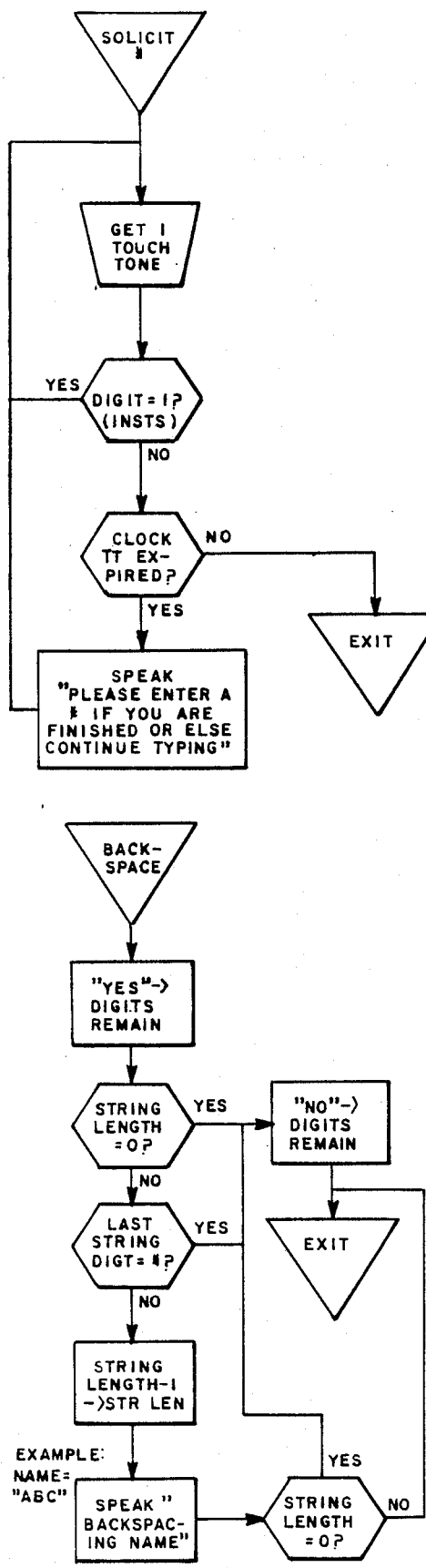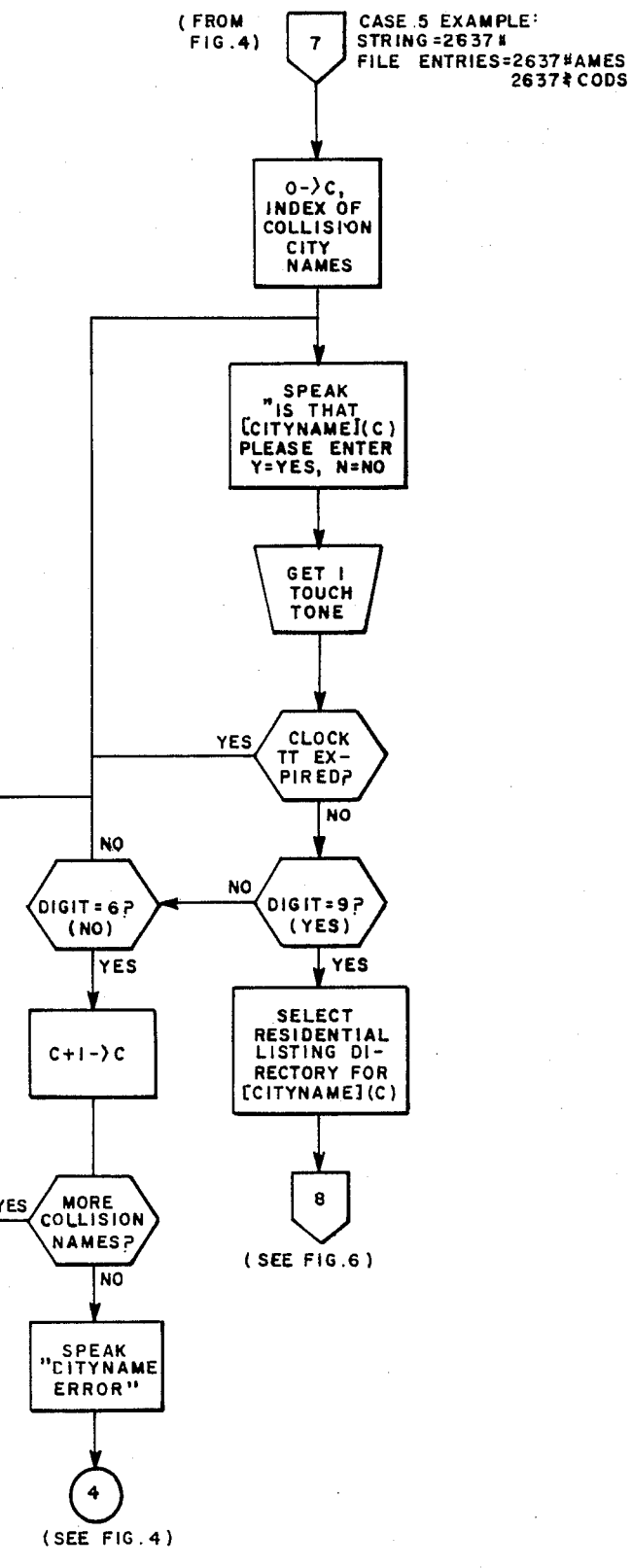
Fig. 5

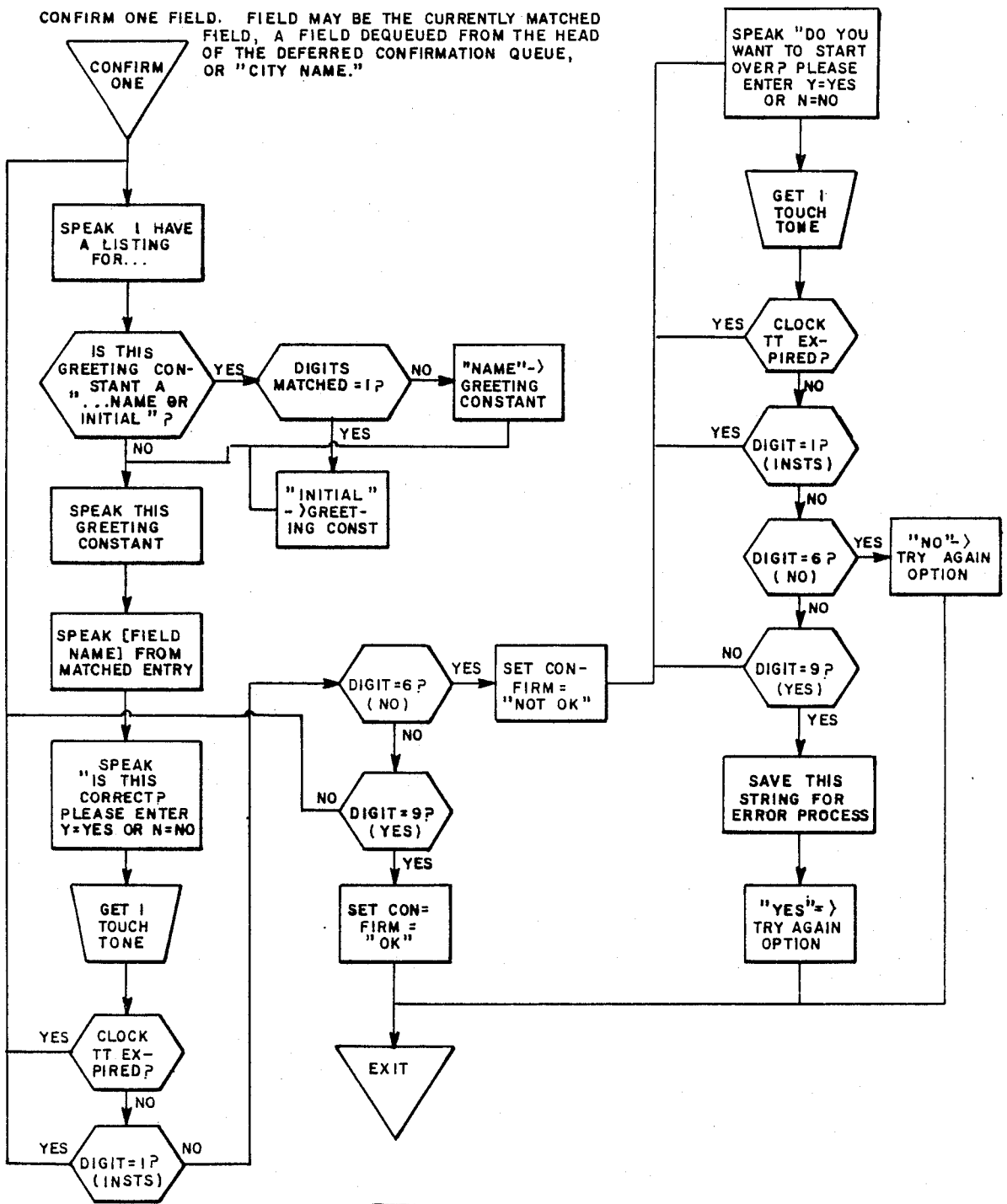

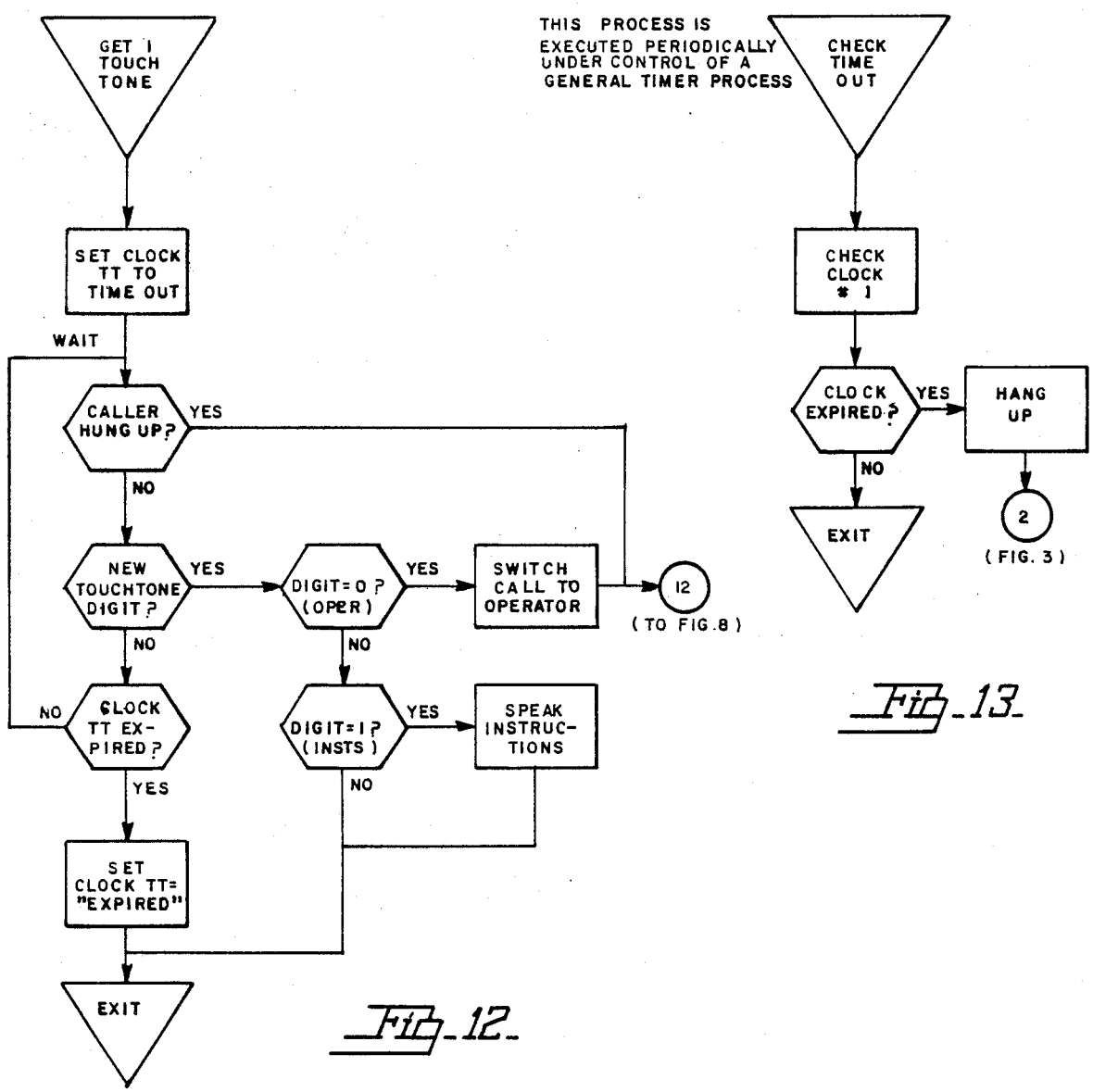

METHOD OF AND MEANS FOR ACCESSING COMPUTERIZED DATA BASES UTILIZING A TOUCH-TONE TELEPHONE INSTRUMENT

CROSS REFERENCE TO RELATED APPLICATIONS

The present application relates to improvements upon the invention disclosed in my earlier application Ser. No. 595,788 filed Apr. 2, 1984, now U.S. Pat. No. 4,649,563.

BACKGROUND OF THE INVENTION

1. Field of the Invention

The present invention relates generally to computer systems, and in a more particular sense relates to a telephone directory listing information system in which a computer is connectable through a telephone network to remote locations from which queries can be directed to the computer, and to which the computer transmits a suitable response.

2. Description of the Prior Art

Typically, in systems of the type described, a computer-stored data base is accessed through a telephonic communications network. One keyboards, using the telephone touch pad, an alphabetic or alpha-numeric query, in order to transmit questions and requests for information from the remotely located data base. From the data base, a synthesized voice response is transmitted to the caller.

The normal procedure is to require keying of the entire name, and in some instances the complete address, before processing the inquiry through the data base.

It is clear that the present arrangement has the disadvantage in that it consumes excessive time for processing inquiries for telephone directory information. And, it multiplies the possibility of keying errors, in that the more characters a caller has to key, the more chances the caller has to make an error. This in turn means increased dissatisfaction with the system, a serious reduction in the capability of the computer to respond accurately or even make a response, and an even greater average in processing time per inquiry.

It has heretofore been proposed, in this regard, to utilize a telephone instrument having a touch pad as a form of computer terminal, to provide access to a computerized data base. Heretofore it has been proposed that the touch pad be modified substantially and/or operated in a manner that requires double-punching of the keys or other relatively complex input modes.

It has also been proposed to implement digital techniques for computer voice response in, for example, a directory assistance system, wherein the user keys in the full name, then *, initials, then * on a "Touch-tone" telephone, and wherein the computer voice response provides, typically, telephone, room, and organization numbers of the individual whose name and initials were keyed by the user.

This arrangement has a notable disadvantage in that there is no interaction between the computer data base and the user until the user has keyed in the full name, and the initials, of the individual whose telephone number is sought by the user, no matter how long that name may be and no matter how difficult its spelling.

SUMMARY OF THE INVENTION

The present invention aims to obviate the disadvantages that have been noted in connection with the prior art. To this end, summarized briefly, the invention utilizes a completely conventional touch pad of a telephone instrument, requiring no masking of the pad, and requiring no requirement for double-punching of keys, or other complex modes of inputting information into the telephone network to provide access to the computerized data base. Rather, the invention involves no more than a simple impression of a word or words upon the touch pad, by selecting the keys which have alphabetic indicia that permit spelling out of the legend that is to be transmitted to the data base.

In accordance with the invention, it becomes unnecessary to key in one's full name, * initials, and another * when the invention is applied, for example, as a directory assistance system or in establishing direct telephone communication between the user and the person whose name has been keyed into the telephone instrument. Instead, after each keystroke the computer searches its data base to achieve "unity" with only those letters already entered. Thus, as soon as the computer establishes that there is one and only one name that contains the string of letters already keyed in, or that the data base does not contain any target listing having those letters, it provides the user with a response.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIGS. 3–13 are schematic representations in the form of flow charts illustrating an improvement in the invention as applied to a telephone directory information system.

DETAILED DESCRIPTION OF THE PREFERRED EMBODIMENT

Figure 1:
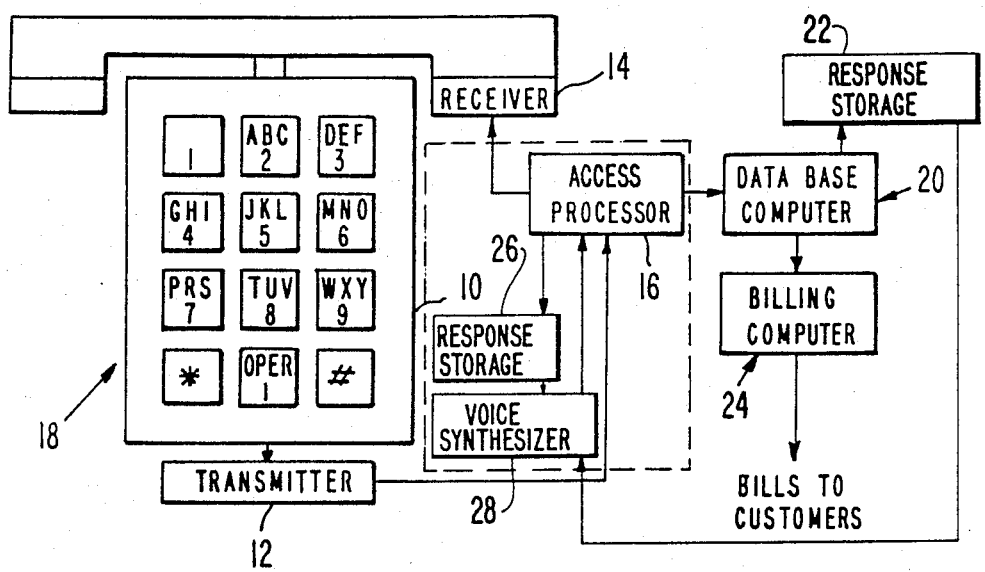
FIG. 1 is a block diagram of the invention covered in the above-referred-to application Ser. No. 595,788 (now U.S. Pat. No. 4,646,563), showing schematically the relationship of the telephone instrument when interfaced with associated computer components.
Figure 2:
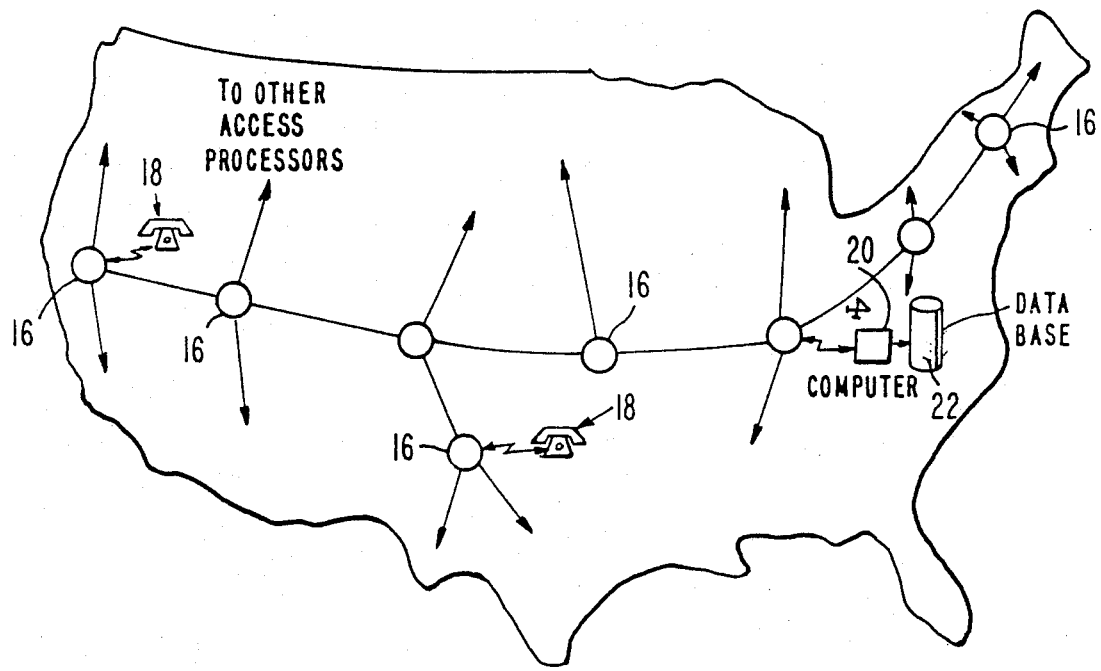
FIG. 2 is a schematic representation illustrating a national map and the manner in which a system according to the invention of said earlier application can be extended on a nationwide basis.

The description which follows comprises first, a description of FIGS. 1 and 2, said description and drawing figures being those found in the above referred to earlier application Ser. No. 595,788, now U.S. Pat. No. 4,649,563. Secondly, there is included a description of FIGS. 3–14, comprising added matter not disclosed in the present case. In both instances, the concept of spelling out a word by a single depression, for each letter, of only that key (and no others) that represents that letter, is retained.

Referring to FIG. 1, the reference numeral 10 designates a completely conventional keypad of an ordinary telephone instrument of the "Touch-tone" type. The telephone instrument of which key pad 10 is a component also includes transmitter 12 and receiver 14.

Designated as 16 is an access processor, which itself is a computer station connected between the telephone instrument and a main frame computer located at a suitable geographic location which as shown in FIG. 2 can be anywhere in the nation.

Telephone instrument components 10, 12, 14 are part of a telephone instrument generally designated 18 in FIG. 2. Telephone instruments 18 are connected to access processors suitably located across the nation as part of a national network. All telephone instruments in a particular region feed into a regional access processor, which in turn is connected to a main frame computer 20 provided with suitable data bases 22.

Essentially, this comprises the complete system. As indicated above, each and every component of the system is, per se, conventional and it is of particular importance that no modification of the telephone instrument, in any way, is required.

The usefulness of the system disclosed in my parent application is found in the fact that it incorporates in a completely conventional telephone instrument the capability of substitution of the instrument for a computer terminal having alpha-numeric capability. Considering that only a comparatively few residential or small business subscribers have, at present, terminals of this type, the present invention enables a greatly expanded number of potential users to have access to data base distributors. In this system, the telephone instrument becomes the computer terminal, in that the key pad of the instrument assumes the encoding and transmitting function of a computer terminal keyboard. A response from the computer becomes an audible message addressed to the calling telephone and received by the user through the receiver of the telephone instrument. The telephone instrument receiver in this way assumes the function now discharged by a display screen and/or automatic printer located at the site of the computer terminal from which the inquiry came.

As an example, suppose it is desired to input the word P-A-T-E-N-T using a key pad of the telephone as part of a data base inquiry. Using a computer terminal the word PATENT would be typed on the keyboard. Using a key pad telephone, the pad keys have letters superimposed upon numbers according to the following scheme:

| ALPHABETIC | | | NUMERIC |
|---|---|---|---|
| A | B | C | 2 |
| D | E | F | 3 |
| G | H | I | 4 |
| J | K | L | 5 |
| M | N | O | 6 |
| P | R | S | 7 |
| T | U | V | 8 |
| W | X | Y | 9 |

In this scheme, the letters Q and Z are assigned to the numeric digit 1. The numerics 0 and 1 do not now have an alphabet assigned to them. In addition to the numerics 0–9, there are two keys labeled * and # which do not have any alphabetic assignment. For the purposes of the invention disclosed in FIGS. 1 and 2, they are assigned as "space" and "end transmit" respectively. However, in the improvement disclosed in FIGS. 3–14, they have been given new meanings, as will be apparent from the description of FIGS. 3–14.

So, to express the word P-A-T-E-N-T, the numeric keys 7-2-8-3-6-8-# are depressed. It is postulated that computer intelligence can decode this numeric string back to the original alphabetic string.

In the first place, a trivial solution to the decoding, is to have the computer, for a limited set of data, convert all expected alphabetic strings to numeric strings and store them in a file. Then, receipt of a numeric string causes lookup in the numeric string file and the conversion to the alphabetic string is thus achieved.

In the case of a duplication such that two (or more) identical numeric strings resulted from different alphabetic strings, the computer is programmed to ask the user which alphabetic string was intended.

The concept of programming a computer to speak to the user is currently implemented by use of a chip which translates from data stored in the computer memory to intelligible speech.

Another approach to decoding the numeric string back to its original alphabetic string is to employ algorithms which might be used in breaking military codes. It is to be noted that military code breaking was one of the earliest tasks assigned to computers. Computers are able to break codes which military users desire to keep encrypted. It follows that computers have a much easier task breaking codes that users desire to have broken.

Taking the example of P-A-T-E-N-T, encoded as 7-2-8-3-6-8-#, the computer has the task of examining the numeric string to determine its original alphabetic string. This is easily accomplished by taking advantage of the redundancy inherent in the English language, particularly with respect to the usage of vowels vs. consonants.

The possible alphabetic combinations resulting from the numeric string are derived as follows:

| Numeric | 7 - | 2 - | 8 - | 3 - | 6 - | 8 - | # |
|---|---|---|---|---|---|---|---|
| Alpha- | P | A | T | D | M | T | |
| betic | R | B | U | E | N | U | |
| equivalents | S | C | V | F | O | V | |

The computer, in accordance with the invention, disclosed in the parent application, is programmed to create the table of alphabetic equivalents, as above, and then to scan the table from left to right discarding all the impossible combinations. For example, the string beginning with the numeric 7 equated to P-R-S results for the first two letters in P-A, P-B, P-C; and S-A, S-B, S-C. Of these nine combinations, clearly only P-A, R-A and S-A are admissable strings. The others are impossible and so forth, across the possible alphabetic string combinations corresponding to the numeric pair 7-2.

As the computer proceeds across the numeric string, two letters at a time pairing numerics first-second, second-third, third-fourth, fourth-fifth, etc. discarding all impossible strings, only a very few strings remain which are possibly valid with respect to the English language.

For example, for the word "PATENT", other possible strings are RATENT or SATENT. Impossible strings are RBTENT or SBTENT, etc. After discarding all impossible strings, the computer evaluates the remaining possible strings to deduce what the questioner had in mind.

After deducing what the questioner had in mind, i.e., selecting from among the possible strings, the computer checks its memory versus those strings which are relevant to the phone number at hand. If after reviewing possible strings which resulted in redundant possible strings, e.g., PATENT vs SATENT or RATENT and finding more than one in the data set of allowable inputs to the specific phone number, the computer will then be instructed to verbally ask the questioner which word is meant. That is to say for example, the computer speaks to the inquirer and says "Do you mean 'PATENT' or 'SATENT'? If you mean 'PATENT' push the number 1. If you mean 'SATENT' push the number 2."

Another relevant piece of technology is a "valid word dictionary" of upwards of 50,000 words which is a common device in word-processing systems. The dictionary is used to catch spelling errors by assuming that a correctly spelled word will be in the dictionary whereas an incorrectly spelled word will not. This would be useful in sorting out a syntactically valid alphabetic string such as R-A-T-E-N-T from actual valid words.

To summarize the above, the computer will have the ability to distinguish from a given numeric string, the alphabetic string which the caller had in mind. The computer achieves this by analysis of the redundancy in the English language and by the analysis of the closed data set of subject matter appropriate to the given telephone number which was called.

In addition to the computer's ability to distinguish the meaning of a numeric string and to search its memory for those alphabetic strings appropriate to the given telephone number, another capability is achievable by the computer due to the nature of the telephone system. When a telephone call is placed, the telephone central has the ability to detect the caller's telephone number. This is why automatic dialing (without operator assistance) is possible and "AMA" (Automatic Message Accounting) can be achieved by the computer.

The telephone company has in its computer memory banks the geographical location of every central office. For example, for telephone number 609/397-2619, the telephone company computer has a pair of horizontal and vertical constants called H-V which are equivalent to the latitude and longitude correct to about one minute of the central office at 609/397. Therefore, when a call is placed, the computer knows the geographical location of the source. So, for many kinds of information bank questions, such as, "Where is the nearest dry cleaner?", the computer can answer without any specific input by the caller because it knows the caller's geographic location as a function of the telephone exchange from which the call was placed. This analysis of geographic location and request for information represents a wide range of currently implemented information services such as dealer information supplied in response to "Where-to-buy-it" questions.

In addition to the telephone company's knowledge of the geographic location of the source of the telephone call, the situation of the telephone company with respect to spinning off its operating companies provides an opportunity for independent information service providers.

The telephone company currently provides information services called "936" or "Dial-It" services, such as, weather (936-1212) and time (936-1818). These services provide the same number nation-wide for a given service. That is, 936-1212 is the number in New York, San Francisco or Philadelphia for the weather. Therefore, having a nationally advertised telephone number which is constant throughout the country, one can have national advertising referenced to the data bases which are provided by the service.

For example, analogous to the weather service and time service, the invention permits establishment of a telephone service to provide current stock quotations. It is assumed that this type of service would be provided by organizations not associated with the telephone operating companies. It is assumed that the operating companies will deliver a service of a "976" nature, bill the caller, and remit to the information provider a portion of the charge made to the caller. As an example, "976-FILM" could be a service to provide callers with the name, address and show time of the nearest movie theater which is playing a movie whose title the caller would keyboard in the numeric fashion. Perhaps the most important application of this technique would be to provide an interface between information providers and those people who do not have a computer terminal. Such providers may include, for example, a company supplying stock quotations; or perhaps a company that will advise the nearest location where a particular movie is playing.

As an interface between the callers without computer terminals and the information providers, this computer system receives calls from the "Touch-tone" telephones and translates them into data which appears to the information provider as if it had been received from a computer terminal. The data is then sent along to the designated information provider company. When the information provider company provides the output data in digital format which is intended for transmission to a computer terminal, the computer system receives such data and translates it into a vocal response back to the caller. For example, if a caller on a telephone were to ask the name of the nearest theater playing "Casablanca", this data would be relayed to the information provider that has previously put up the data bank. The answer, e.g., Rialto, is provided digitally by the data base owner and is intended for transmission to a computer terminal. Instead of going to a computer terminal, the characters R-I-A-L-T-0 would be sent to the proper node of the interface computer network system and there transformed into the vocal response "RIALTO" which would then be relayed via telephone to the caller.

A problem arises in the use of a system of this nature to answer inquiries generated by advertising, such as, "Where to buy an Arrow ® Shirt"? The computer can respond, for example, "J. C. Penney, Quakerbridge Mall" in response to the keyboarding of "Arrow ® Shirt" (2-7-7-6-9-*-7-4-4-7-8-#) without any difficulty but the problem is that the advertiser wants to know which advertising medium generated the inquiry (for purposes of advertising dollar allocation).

This is readily solved in practicing the invention by programming the computer to initiate a dialogue such as:

Computer: "Thank you for requesting the name of your nearest Arrow ®Shirt dealer. Please keyboard the name of the medium in which you saw the advertisement."

Caller "TIME MAGAZINE". (8-4-6-3-*-6-2-4-2-1-4-6-3-#)

The computer is thereby enabled to decode the string for the name of the medium and provide the data for the advertiser.

An advantage of this system is substitution of low-cost digital data transmission, such as is available from several X.25 networks, for expensive voice transmission. The usage of voice-to-digital computer network nodes allows substitution of digital data transmission for inward WATS for information dissemination.

This discussion has assumed that a telephone having a key pad is required to communicate with the system. If such is not available, hand-held tone generators are available at relatively low cost.

In the event that keying errors are made on the tone pads, the computer system would be able to perceive the error quickly. Various techniques currently employed in the telecommunications industry would be used to decipher the caller's intent.

One procedure, known as "answer back analysis", can detect errors and determine the caller's intent in over 99% of the errors. In case of a dubious decision, the computer can always ask the caller his intent.

This disclosure deals with being able to have the telephone supply numeric inputs that can be interpreted by a computer to be alpha-numeric without any prior operator training. Also, no special training such as multiple keying of the telephone pad is required for alpha-numeric.

It will be necessary to add a speech synthesizer to each of the conventional access processors in order to have computer generated voice output back to the telephone that made the original query. Thus, the access processor will consist of the following sections:
Disc file with "Banner" messages
Concentrator/Deconcentrator
Multiplexer/Demultiplexer
Protocol Conversion
Speech synthesizer to serve a number of ports
Capability of handling several thousand ports
Packet assembler/disassembler Referring again to the drawing, in a typical situation the input message is directed from the telephone instrument (and in particular the transmitting components thereof) to an access processor 16. The access processor reads the pulses transmitted and converts them to a digital protocol, that is, the analog waveform of the transmitted pulses is converted to a digital form in which it becomes a stream of binary "bits", known in the computer art as "digital protocol". The conversion is effected by circuitry well known in the computer art and basic to present-day computer structure, in which such conversions are routinely made in the analog waveforms received from the keyboards of computer terminals. At the access processor there is also provided local data storage, identified in FIG. 1 as "response storage" and designated 26 in that figure of the drawing. If the inquiry is such that it can be answered by utilizing the data maintained at the local access processor storage, the access processor conducts a dialogue, that is, it responds to the inquiry, utilizing pre-packaged messages from the local audio storage. This utilizes a voice synthesizer 28 which is converted from the digital message protocol, and is transmitted from the access processor to the receiver of the telephone instrument.

In the event that response to the inquiry cannot be made utilizing local storage of data at the access processor, the access processor transmits the message in digital form to the main frame computer, via the network shown in FIG. 2. Here there is called into use the concentrator/deconcentrator; or the multiplexer/demultiplexer; or the packet assembler/disassembler.

With the digitally encoded message transmitted from the access processor to the data base computer 20, there is transmitted the calling number, and the called number. These go along with the numerically coded inquiry data.

Upon receipt of this message at the computer, the computer, by reference to its data bank or base 22, transmits alphabetic data to the access processor for conversion by voice synthesizer 28 to the synthetic voice mode as a response to the input query. And, the computer may also transmit coded data to control the dialogue with reference to local audio storage at the access processor.

The computer, at the same time, as shown in FIG. 1, transmits data to the telephone company's billing computer 24, which receives this data and utilizes it for the purpose of generating a bill chargeable to the subscriber who has made the inquiry.

There will now be described the subject matter added by this continuation-in-part application, and not disclosed in the parent application.

FIGS. 3–14 are flow charts illustrative of the inventive concept as applied to a telephone company automatic directory assistance system, and in particular, a system of directory assistance for residential listings.

The system is organized in a modular fashion, and the processing is controlled by tables. In this manner, a new application such as telephone company "Yellow Pages" data base access can be built primarily by construction of a new table.

There are two processes involved in the system herein disclosed—data base update and inquiry processing. The two processes interact so as to facilitate the orderly processing of inquiries. The data base update examines selected fields in the new records which are to be added to the data base or selected fields which are to be changed.

In the example of automatic directory assistance for residential listings, the special fields which the data base update subsystem processes are the last name, first name or initial, middle name or initial, street name, and city name. Each of these fields is converted to its "Touch-tone" numeric equivalent".

The "Touch-tone" numeric equivalent of a letter in a field is taken from the "Touch-tone" buttons on the telephone, viz., the A and B and C are converted to a "2", the D and E and F are converted to a "3", and so on for the buttons 2 through 9.

The letters Q and Z, which do not appear on the "Touch-tone" key pad, are assumed to be on the "7"and "9"buttons respectively so that the "7"button is by convention PQRS and the "9"button is WXYZ.

The numeric fields and their corresponding alphabetic fields are separated by a # character which acts as the terminating character of each field. For example, the directory entry for "JONES JOHN ADAM MAIN TRENTON" (last name, first name, middle name, street name, city name) in TRENTON would be represented in the data base as 56637#5646#2326#6246#8736866#JONES#JOHN#ADAM#MAIN#TRENTON#.

When users attempt to gain access to the data base, they will do so by keying the "Touch-tone" digits, which will be compared by a computer process to the numeric equivalents of the alphabetic characters. It is only necessary for the users to press one button, once, to represent one letter. For example, to input the letter "A", the user will press the "2"button, once The computer process does not immediately recognize the "2" as being intended to represent the letter "A" but the concatenation of multiple digits will eliminate ambiguities in the entered string of numeric digits so as to decode their alphabetic equivalents. The buttons "2" through "9" can be considered as a number system to the base eight. The full alphabet can be considered as a number system to the base 26.

Even though eight is much less than 26, it is clear from examining the above listing example containing 24 "Touch-tone" numeric equivalent digits that eight raised to the 24th power is enormously greater than the total number of entries in, for example, the Trenton, N.J. telephone book. Therefore, the system of representing people, objects, names or titles using the base of 8 instead of the more familiar 26 is sufficient to identify an individual data element such as a telephone book entry.

It is also pertinent to state that the 26 letter alphabet and the words it composes are full of redundancy. The vowels, for example, are needed to make the words pronounceable, but are not needed to differentiate one word from another. This is the basis of a common shorthand system, in which one writes words without writing vowels because it is known that the vowels are redundant, and that the words can be later recognized when transcribing the dictation without requiring the vowels to be present.

The system comprising the present invention also recognizes the possibility of a "collision", that is a word or a name which has the same "Touch-tone" numeric equivalent as another word or name. An example is the names OHLER AND MILES. Both have the same "Touch-tone" numeric equivalent, 64537. During the development of the inventive concepts herein disclosed, an attempt was made to assess the probability of this occurrence in a large system such as a telephone company directory assistance system.

A conversion of 12,556 surnames to their "Touch-tone" numeric equivalents produced only eight collisions, and even these could have been avoided by entering the first names.

These were "single" collisions, i.e., only two names were involved in each collision. Therefore, it may be assumed that although collisions may occur, they are rare enough so as not to interfere with the practicality of the present "dial-by-name" system. The processing recognizes when a collision occurs and treats it accordingly, thereby establishing viably the capability of "Touch-tone" numeric equivalents to identify data base entries uniquely and practicably.

The data base update system maintains the listing file in subfiles hereinafter called "filettes". A filette has the property of being less than or equal in size to a buffer area maintained in Random Access Memory (RAM) during inquiry processing. The inquiry program maintains one buffer per telephone line. Individual buffers are not dedicated to individual telephone lines but are assigned to lines during processing as required. An individual filette in a particular RAM buffer may serve multiple telephone lines simultaneously, should multiple telephone lines be in use, for the purpose of searching for entries which are all in the same filette.

The filette boundaries which are the first and last records in the filette are loaded into RAM together with their disk addresses and act as indices to the totality of filettes resident in the disk file. While the user is entering "Touch-tone" digits, each digit is appended to the string of previously entered digits.

With each new digit appended to the string, the inquiry program compares the string to the filette boundaries in RAM to determine whether the string is long enough so as to identify uniquely the filette containing the target listing. When the proper filette for the string has been identified, the filette is loaded into RAM from disk (unless it has been previously loaded into some other buffer because of processing a previous inquiry) and subsequently the individual listing entries of the filette are examined in RAM after each new digit is appended to the input string. In this way, the number of digits required to identify a target data base entry and to identify it uniquely is absolutely minimized and also the number of disk reads is absolutely minimized (to one read).

In case of a collision in all the fields of a listing entry so that the numerics cannot identify an entry uniquely, provision is made to read all of the entries that have collided to the caller, and to ask him to choose one with a Y(es) or N(o) response to be entered on his "Touch-tone" pad.

Certain conventions were observed in preparation of FIGS. 3–13, in terms of the shapes and their associated meanings. A rectangle (containing text) indicates a step to be taken. For example, the text "get next update record" is enclosed in a rectangle. An irregular hexagon with an entry arrow and two exit arrows is a "decision" box. Thus, the text "last record? "enclosed by an irregular hexagon having two exit arrows labled "yes" and "no" is a "decision" box.

A circle containing a number is an entry point in the processing, generally on the same page as another circle with the same number. These are mostly used instead of long lines to connect different boxes.

Entry points from or to different pages are represented as irregular pentagons. Where entry points are to or from different pages, they are so labeled such as the "13"in the irregular pentagon of FIG. 3.

A trapezoid with the small side on the bottom represents a process step which can be executed from the main flow of the processing. An example is the trapezoid containing the text "get 1 'Touch-tone'" in FIG. 3. The detailing of the process represented by the trapezoid is enclosed by triangles representing the beginning and ending of the process. An example is in FIG. 12 which is the detailing of the process for "get 1 'Touch-tone'". The entry triangle contains the name of the process ("get 1 'Touch-tone'") and the exit triangle contains the text "exit".

The process shown on these charts is demonstrated for a single telephone inquiry. The system processes multiple inquiries simultaneously. For example, the system under discussion handles 32 inquiries simultaneously.

It is recognized that exceptions will exist in an actual telephone company data base to the common listing format demonstrated in the drawing. Examples are "Teenager's telephone" and married couple listings such as "JONES, JOHN & MARY". The chart does not demonstrate processing compressed data found in telephone company data bases. An example of data compression is the single instance of the name JONES with various data base mechanisms to indicate that this JONES applies to many successive data base entries.

Figure 3:
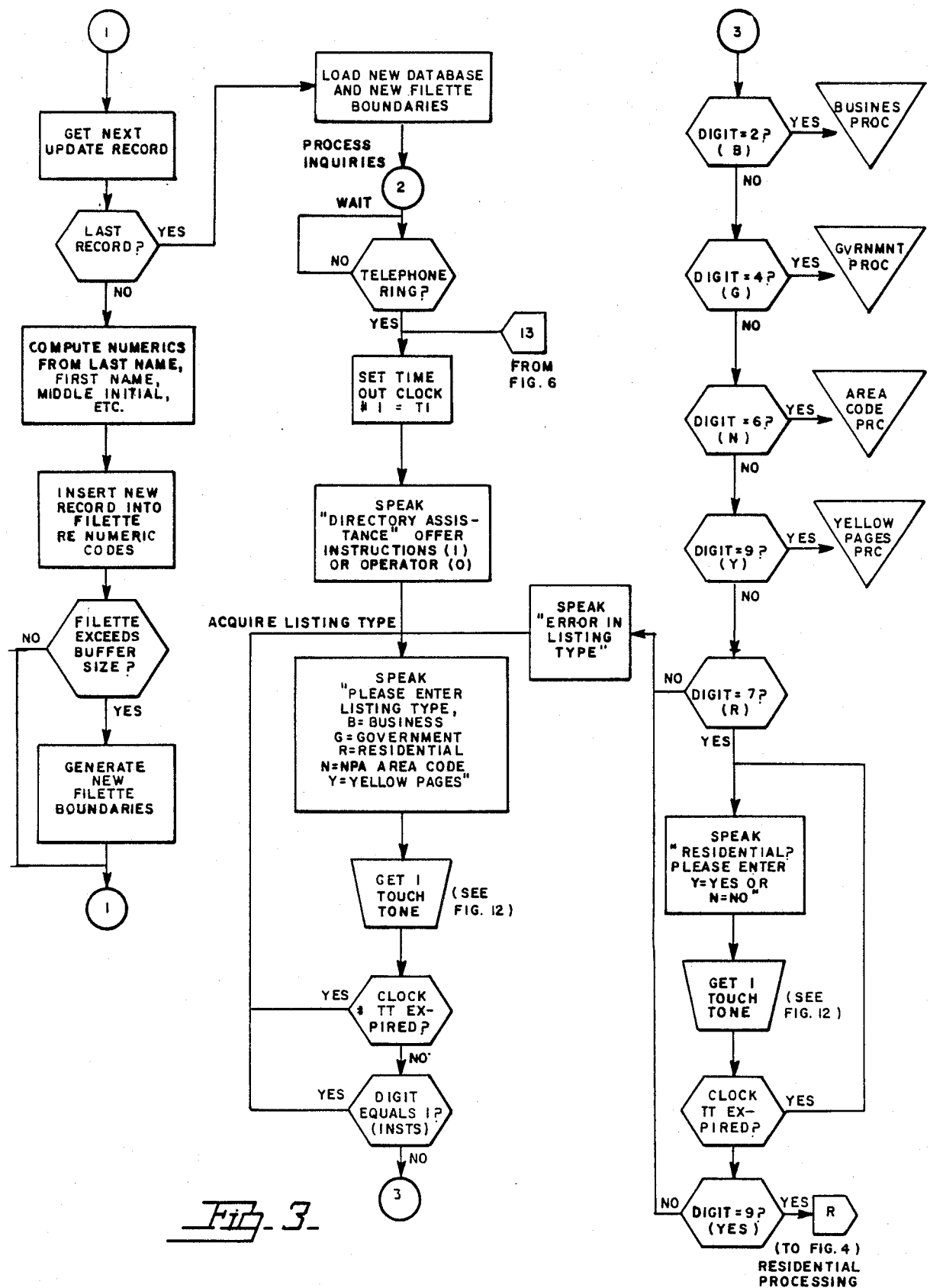

The general discussion of the invention set forth above is thought to provide an understanding, in a broad sense, of what the invention of FIGS. 3–13 accomplished and the steps taken to produce the desired results. It is appropriate now to consider the specific procedures involved therein. FIG. 3 illustrates a procedure in updating a directory data base, particularly the operation of computing the "Touch-tone" numeric equivalents of the alphabetic fields. It demonstrates that the update process is cognizant of the buffer size which is used in the inquiry process and that, if necessary, it will resize filettes to be small enough to guarantee that they will fit into a buffer. This processing also generates the filette boundaries that are loaded into RAM for use while processing inquiries. The boundaries are chosen so as to be absolutely unique (not collisions) and to be as short (as few digits) as possible. This means that the inquiry processing can decide which filette to read with the minimal number of digits entered by the user.

The inquiry processing is heavily dependent on real time. Two timers are shown in the charts. The time out clock #1 shown in FIG. 3 is set to expire after about five minutes. (The value of T1 is approximately five minutes.) This prevents trifling with the system by vandals. When the time out clock expires, the system can hang up or can transfer the call to a live operator.

The procedure for acquiring listing type is also shown. Types of listings may be "Residential", "Business", "Government", etc. or whatever may be required by the data base distributor, in this case the telephone company. The listing type is shown as requiring only one digit to be identified although more than one digit is feasible.

The particular listing type which is exemplified by the diagram is "RESIDENTIAL". A residential listing is assumed to consist of four fields which require conversion to their "Touch-tone" numeric equivalents: last name, first name or initial, middle name or initial, street name, and city name.

The street number field is not part of the "Touch-tone" recognition process as it is assumed that if the caller knew the street number, he would also know the telephone number. It is also necessary to restrict the converted fields so as to exclude the digits 0 and 1 which have a different meaning in this context. The conversion restricts the output to the digits The step "get 1 'Touch-tone'" is invoked in FIG. 3 for the first time. (The details involved in this step are set forth in FIG. 12). This process is invoked in almost every figure of the drawing. The telephone management circuit board includes a "Touch-tone" digit receiver which converts "Touch-tone" keying to ASCII digits and saves them until retrieved by the "get 1"process.

As previously described, the buttons 2-9 represent the 26 letters of the alphabet. The zero button is interpreted as a request to switch the call to a human operator. If the caller presses the "1"button, the system will verbalize a brief set of instructions to the caller.

The system interprets the * button as a backspace to correct the entry of the previous digit.

The # button indicates "end of field", for example, the end of the entry of the digits representing last name. The # button is usually not required because the system usually determines the target field without the necessity for the caller to enter the complete set of numerics. The "get 1"process also queries the status of the system to determine whether the caller has hung up.

The function SPEAK is first encountered in FIG. 3. SPEAK is found in most of the figures of the drawing. The function SPEAK means to locate the digitally recorded voice for the desired output. For example, the phrase "please enter..." is recorded on a disk drive and has a specific computer address where it can be located and played over the telephone. The process of SPEAK is analogous to placing a stylus over a particular location on a phonograph record and playing what is recorded at that point. The only difference is that SPEAK as used herein is referring to digital recording instead of analog recording. When the system begins to SPEAK, it sounds an attention tone to alert the caller to listen to the SPEAK output.

When SPEAK refers to a directory entry such as, e.g., "JONES", the process is more complex than playing a constant such as "Please enter...". In the case of speaking a data base entry, the date contained in the data base entry, e.g., the ASCII text "JONES" is used as an index to a speech file containing several hours of recorded digital speech. If the system finds the entry JONES in the speech file, it will be followed on the disk by the digital recording for JONES. The system will then play that segment of digitally recorded speech.

A one syllable name such as JONES will occupy about 2000 bytes of digital recording. The available several hours of digital speech are recorded in the priority sequence of the alphabet, the digits 0-9, constants (Please enter...), city names, common first names, and common last names. When the digital recording file is full, the surplus unrecorded names are simply disregarded. When the SPEAK function fails to find a recorded speech segment corresponding to a data base entry, e.g. RUMPLESTILTSKIN, the system will spell out the name using the digitally recorded alphabet instead of speaking a recorded speech segment as in, e.g., the name JONES. This is useful in that it is comparable to a human telephone operator who will usually speak a name such as JONES and spell a name such as RUMPLESTILTSKIN.

Figure 4:
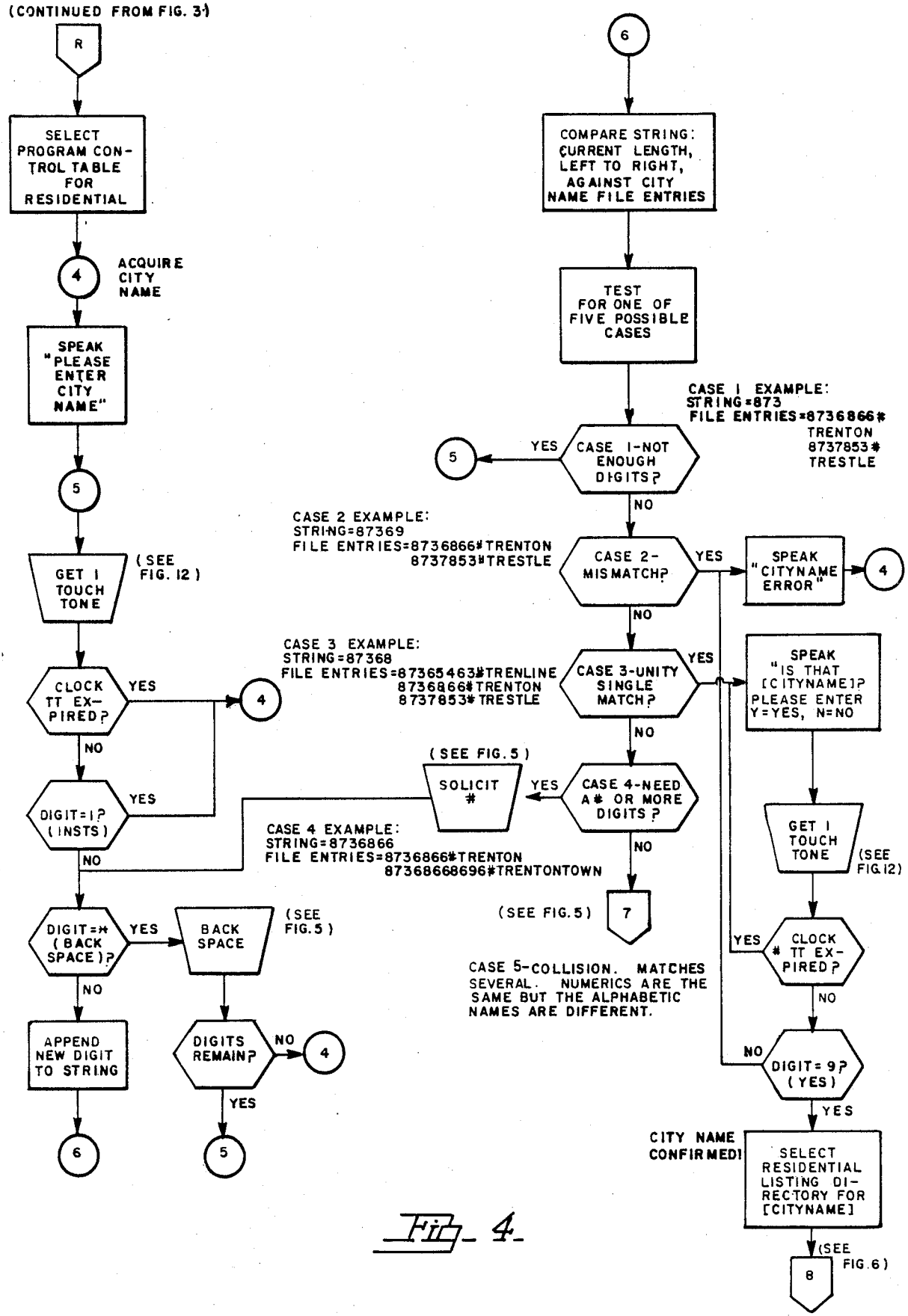

FIG. 4 is a continuation of FIG. 3, and begins the detailing of Residential listing processing by acquiring the city name. The city name is the last field in the listing record but is the first field to be acquired. This is because telephone company data bases are organized by directories or "books" containing several cities. The city name is the lowest ordered field in the sequencing hierarchy of the listings but must be solicited first, in order to select the proper section of the data base directory in which to search for the filettes.

The COMPARE STRING operation compares the caller's string to the list of cities served by this system after each new digit is appended to the string. For example, the 215 area code directory contains the city names "Philadelphia", "Ardmore", etc. These city names are converted to their "Touch-tone" numeric equivalents and stored completely in RAM in their "Touch-tone" numeric equivalent sequence.

There are five possible outcomes of the COMPARE STRING operation. Examples of four of the five outcomes are shown in FIG. 4.

At the bottom of FIG. 4 the system has determined which listing directory to use to find the target residential listing.

FIG. 5 shows the detail of the processes for "solicit #"and for "Backspace". "Solicit #" is invoked, for example, in FIG. 4. The caller is not required to enter the # in all cases. The optional and infrequent entry of the terminating # character is one of the distinguishing features of the system comprising the present invention.

The Backspace function is the same as is found on a typewriter. It allows the caller to correct a digit entry error without starting over from the beginning of the process. Once a field has been "confirmed" (agreed as being correct by the caller), the Backspace function will not allow any of the digits in the confirmed field to be backspaced (erased). It may be that an incorrect digit entry caused the reading of an incorrect filette. This eventuality is recognized and processed by the Backspace function.

The case 5 example of a collision on city name (above referred to as one of the five possible outcomes of the COMPARE STRING operation) is charted. This circumstance would be rare but the possibility is covered by the processing. In case of a collision on city name, the chart depicts reading all of the possible entries to the caller and asking him to choose one. This process could also be applied to the listing entries as well as the city names.

Figure 6A:
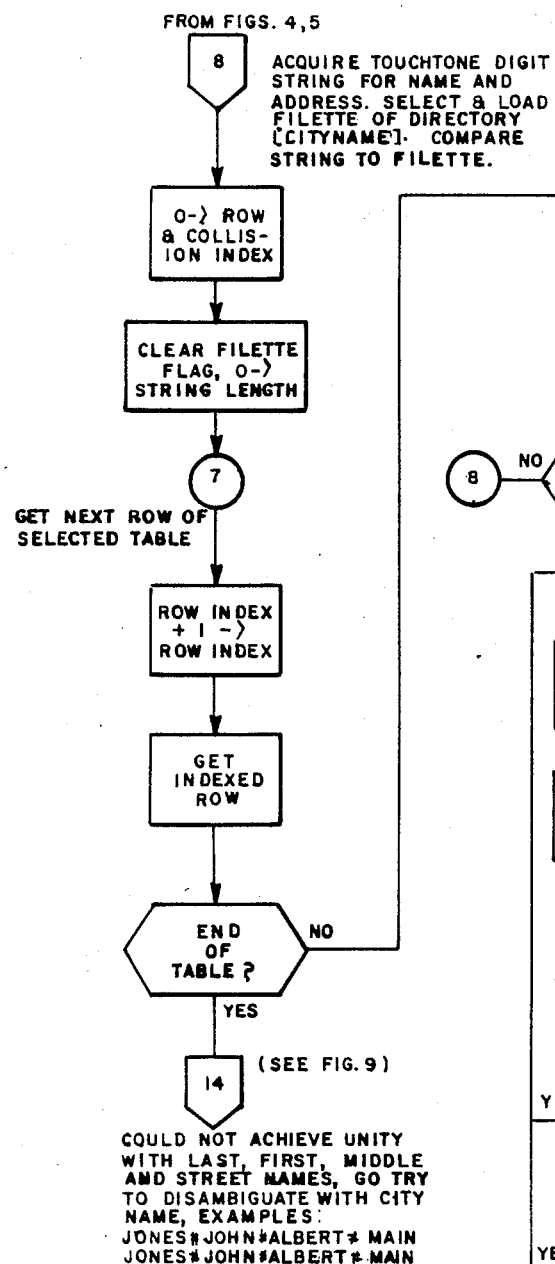
Figure 6:
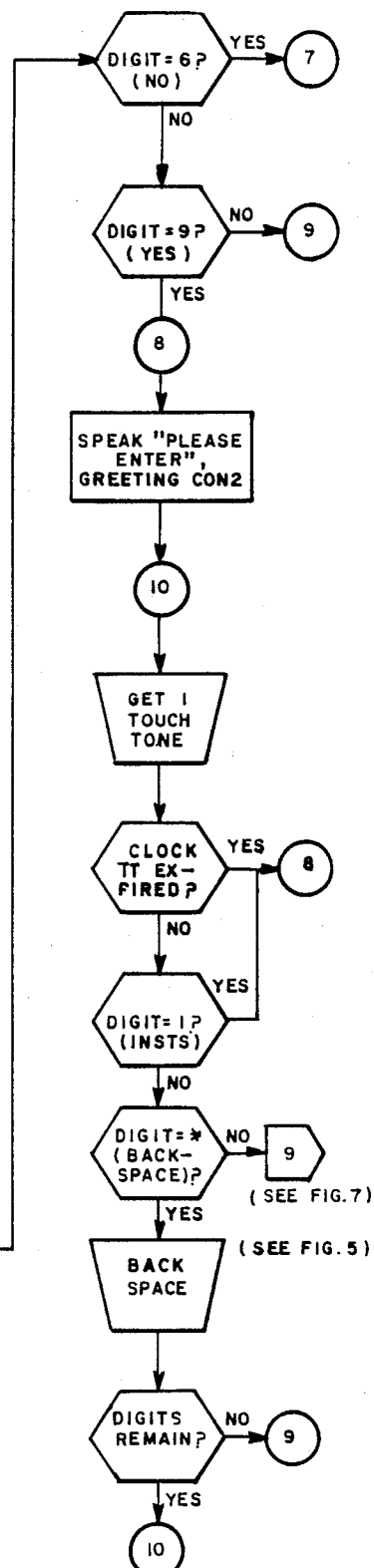

FIG. 6 begins the process of acquiring "Touch-tone" digits, appending them to a string one digit at a time, and comparing the string against filette boundaries and against data base entries.

FIG. 6 demonstrates the employment of a table to control the inquiry processing. It is implicit from examination of this table that other tables could be used for other types of data base inquiries such as for Yellow Pages listings.

When END OF TABLE is encountered, it means that there were several entries which all had the identical fields so that the system could not distinguish one from the other. This situation might be caused by many JONES in Manhattan or by collisions. An example of this situation would be two or more entries all for JONES#JOHN#ALBERT#MAIN(street)#CLEVELAND. The processing to which the chart of FIG. 9 refers is to attempt to find that the several JONES entries were from different cities, not all CLEVELAND.

Figure 7:
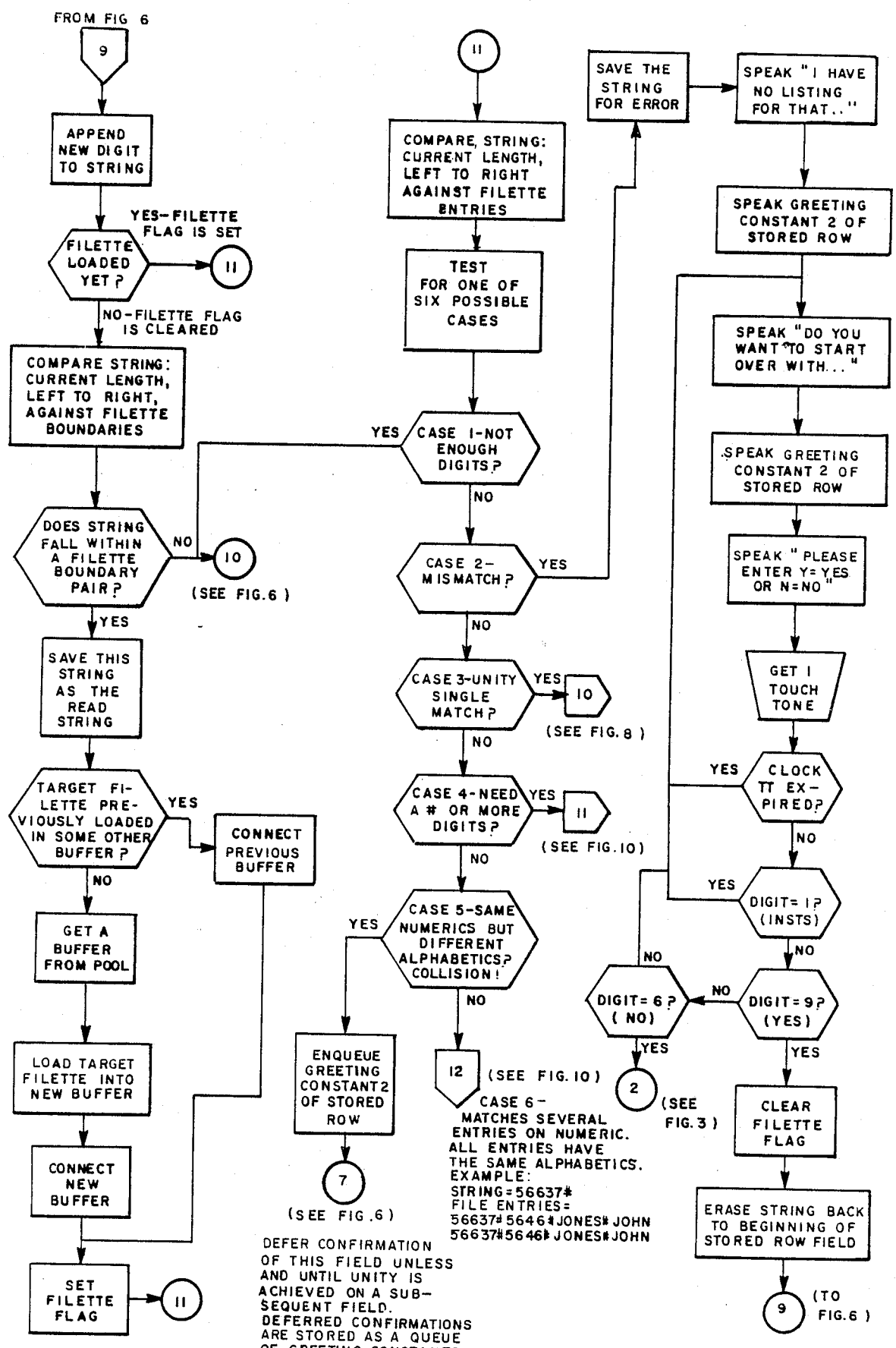

FIG. 7 continues the process initiated in FIG. 6.

Case 5, the collision, is processed differently than a collision on city name. In this situation, the confirmation of the listing entry is deferred until a later field is processed which achieves unity, that is, it is uniquely identified.

Case 6 which is applicable to listing entries was not shown on the processing of city name entries as it is assumed that multiple identical city name entries will not exist in a telephone directory. (The process shown in FIG. 5 will disambiguate the city names in any event). Case 6 will occur frequently in processing directory entries, viz, multiple SMITHs.

Note that if a previous field was a collision and resulted in creating a queue of unconfirmed entries, the Case 6 field cannot be confirmed and must also be enqueued for later confirmation. An example is OHLER# JOHN vs. MILES#JOHN. Once the confirmation of OHLER vs MILES is enqueued as a collision, then the confirmation of JOHN must also be enqueued for later confirmation, perhaps on middle name.

Figure 8:
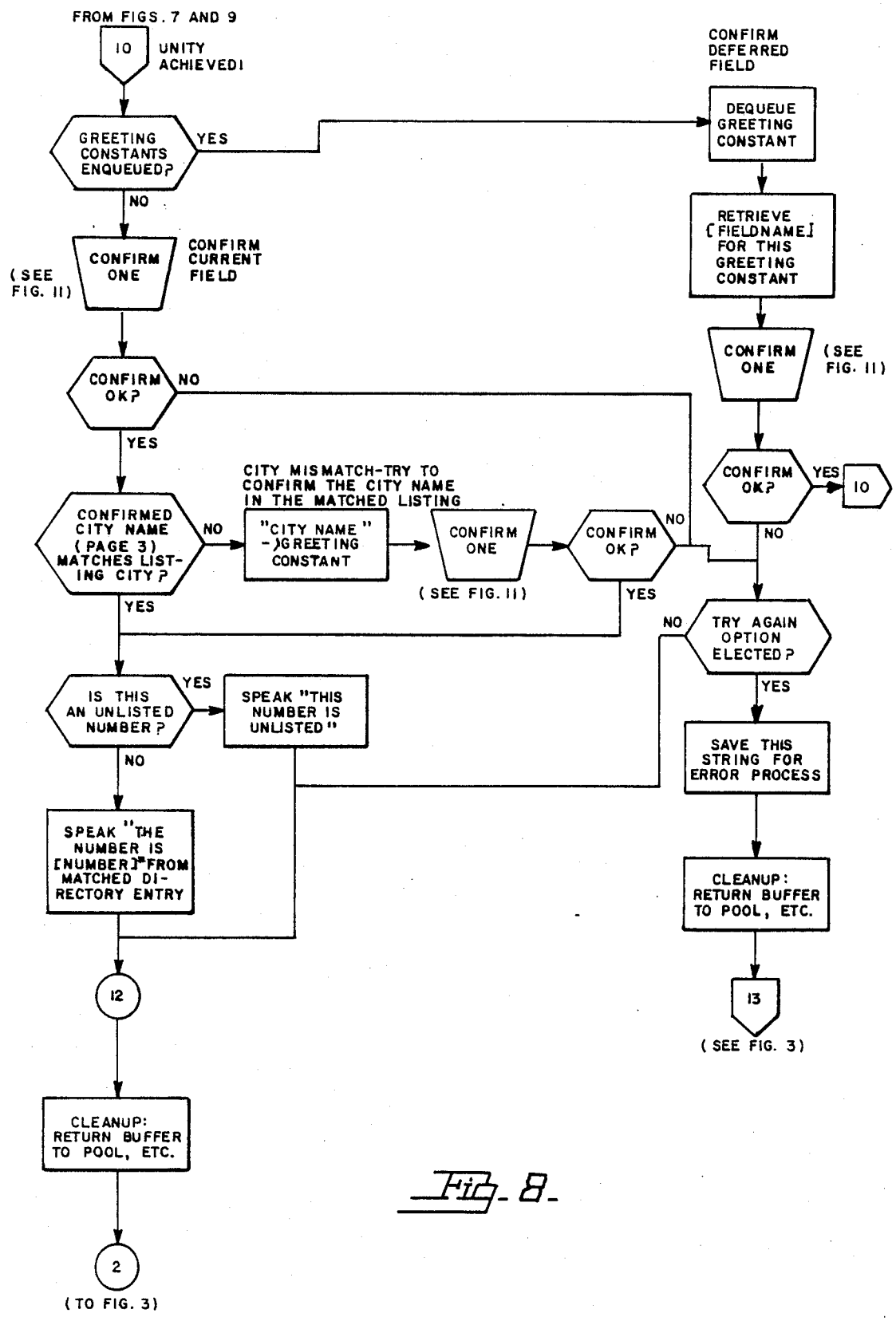

FIG. 8 shows the processing after the system uniquely identified a single data base entry as being the target of the inquiry by the caller. If any unconfirmed fields are enqueued, they are dequeued and confirmed one field at a time. If the city name in the listing entry does not match the city name entered in FIG. 5 the system assumes that the caller is not sure of the target entry city and asks the caller to confirm.

After delivering the target listing telephone number, the system goes back to a WAIT state until the telephone rings again.

If the confirmation process fails, the caller is given the opportunity to start over again. The point of failure is saved for comparison against the string entered in the second try to determine if there was a mistake (e.g., spelling error) on the first try. This would be evident if the string built up during the second try did not match the string built up during the first try.

Figure 9:
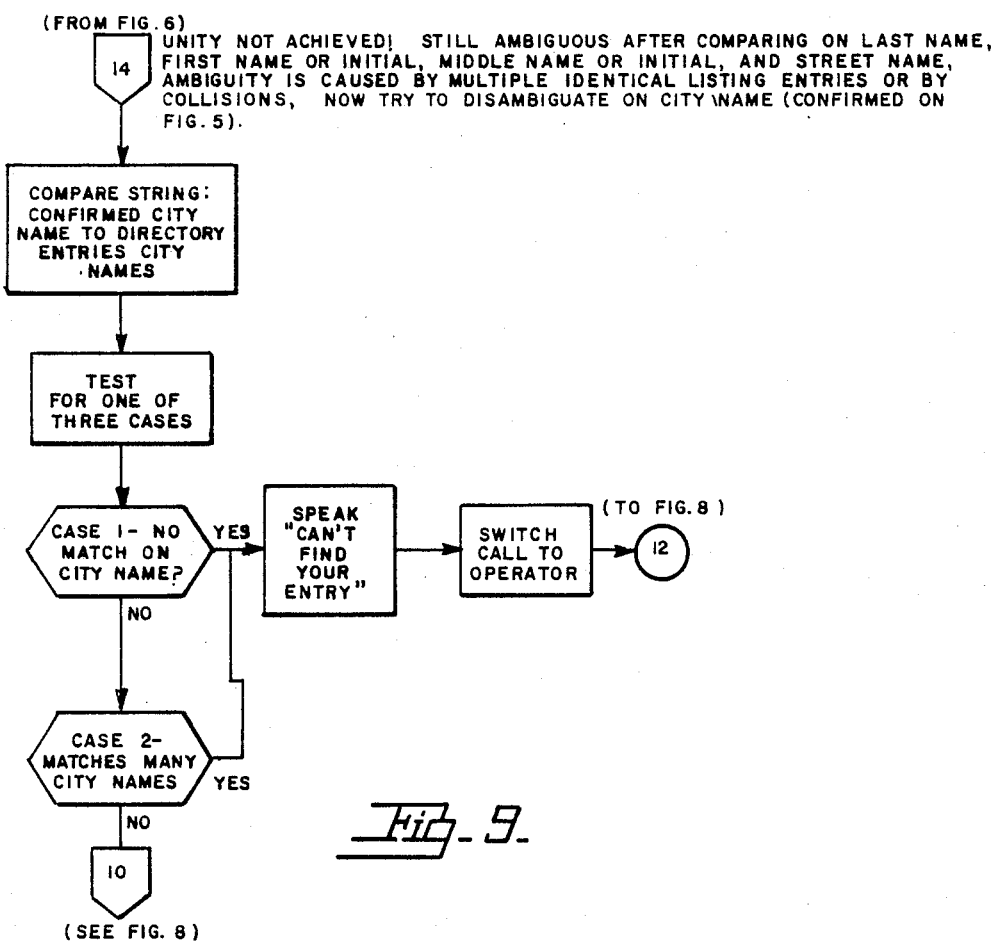

FIG. 9 charts the situation where the listing is still ambiguous and the system tries to differentiate between several listing entries on the basis of city name.

Figure 10:
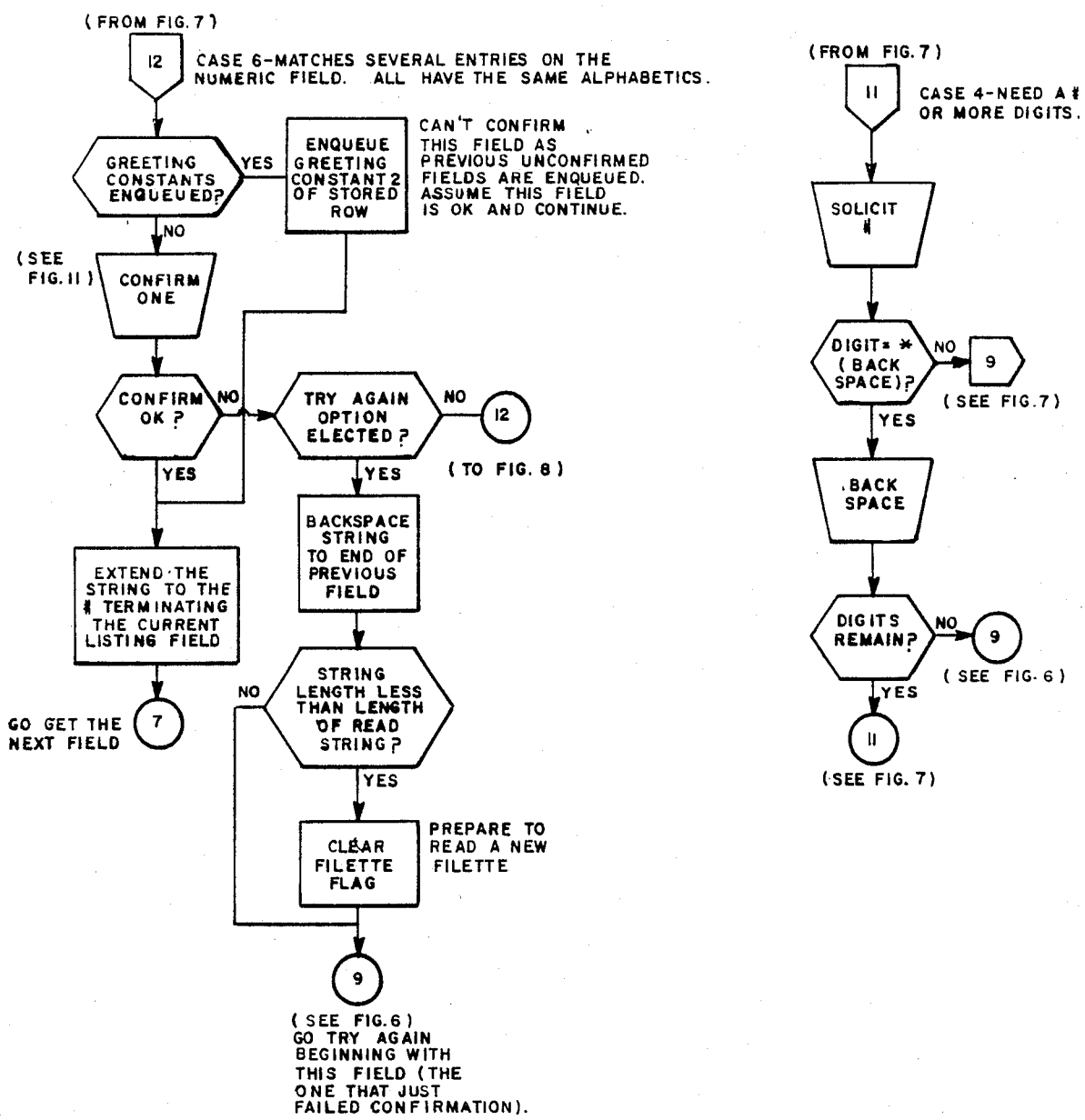

FIG. 10 illustrates the situation of e.g., several SMITHs. Note that the system may sense the SMITH before the caller has entered all the numerics (76484). If the caller has entered only, e.g., 764, the system extends the string with the 84 and a # character in preparation for the later comparison with first name, street name, etc. This illustrates that it was not necessary to enter the last two digits (84) nor was it necessary to enter the terminating #.

FIG. 10 details the process of soliciting a # character in the event of Case 4 occurring in FIG. 7.

FIG. 11 details the process of confirming one field. To confirm a field means speaking the content of the listing file, either by playing digital voice or by spelling the content of the field. The caller is then requested to confirm by entering a Y(es) or deny by entering a N(o). The system proceeds through the listings from left to right confirming one field at a time except for collisions in which the confirmations are deferred until unity is achieved. When it is necessary to defer confirmations, the field name of the deferred field is appended to the tail of a queue. When confirmation is enabled because the system achieves unity, the fields are taken from the head of the queue one at a time and confirmed.

FIG. 12 details the process of getting one "Touch-tone" digit.

FIG. 13 shows the periodic process of checking for a time out and if it occurs, of hanging up the conversation.

OPERATION

Figure 14:
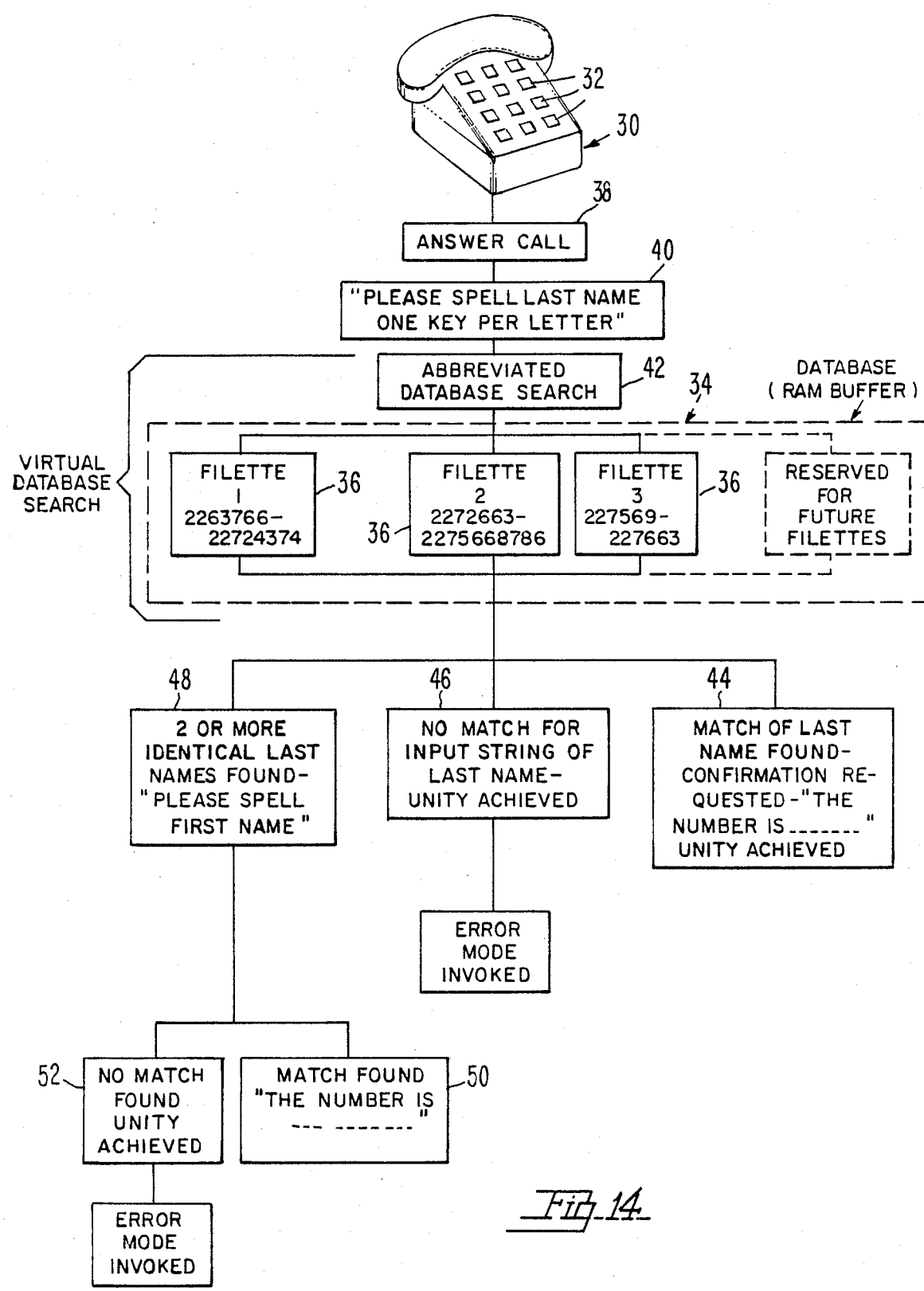
FIG. 14 is a schematic representation illustrating a typical usage of the system.

The normal operation of the system comprising the present invention as employed by a typical caller seeking the telephone number of an individual calling area is diagrammed in FIG. 14 in a highly simplified version of the concept. In actual practice, the data base listings may be as set forth above, but the example of FIG. 14 has been reduced to fundamentals and hence will suffice to explain the basic, fundamental steps in the computerized telephone directory information system comprising the present invention.

In this figure, as distinguished from FIGS. 3–13, the use of different geometric shapes to impart different meanings to the various parts of the drawing, is deemed unnecessary.

In this figure of the drawing, a telephone instrument is provided with a touch pad having keys or buttons 32.

Let it be assumed that the caller seeks the telephone number of an individual known by the caller to reside in a particular calling area.

By way of example, a list of fictitious names has been made up, as they would appear in a typical directory listing prepared in accordance with the invention:

| NUMERIC CODE | SURNAME | FIRST NAME | PHONE NO. |
|---|---|---|---|
| 2263766#766253# | CAMERON | RONALD | 5991633 |
| 2264556#5863### | CAMILLO | JUNE | 2514005 |
| 22657#2427537## | BANKS | CHARLES | 2682533 |
| 22657#5472##### | BANKS | LISA | 6365962 |
| 22664556#252378 | CANNILLO | ALBERT | 9113337 |
| 2266486#34263## | CANNITO | DIANE | 6484979 |
| 226663#567374## | BAMOND | JOSEPH | 8575459 |
| 226666#538232## | BANNON | LEVADA | 5781480 |
| 2267235#9455426 | CAMPBEL | WILLIAM | 4781040 |
| 22672355#5326## | CAMPBELL | JEAN | 3932081 |
| 22672355#846236 | CAMPBELL | VINCENT | 7481321 |
| 2267246266#3364 | CAMPAGNANO | DENISE | 8265104 |
| 2267262#227447# | CAMPANA | BASHIR | 4874290 |
| 2267262#5862### | CAMPANA | LUMA | 6973838 |
| 2267374#427747# | CAMPESI | HARRIS | 6182334 |
| 2267466#472#### | CAMPION | IRA | 9192614 |
| 2267466#7884### | CAMPION | RUTH | 2102621 |
| 2267654#352463# | CAMPOLI | ELAINE | 5573039 |
| 226782#72574### | ACOSTA | RALPH | 5883840 |
| 226825874#533## | CANTALUPI | LEE | 2133059 |
| 2272286#567374# | BARBATO | JOSEPH | 7515492 |
| 227235#7424273# | BARCEL | RICHARD | 4502350 |
| 227237#5646#### | BARBER | JOHN | 4371661 |
| 22723882#765263 | BARBETTA | ROLAND | 7461348 |
| 22724374#945542 | BARBIERI | WILLIAM | 5293539 |
| 2272663#4637### | CARBONE | INES | 7352387 |
| 227267#92963### | ABRAMS | WAYNE | 2035128 |
| 22727672#627427 | CAPAROSA | MARGARET | 8242252 |
| 2273#275363#### | CASE | ARLENE | 2061713 |
| 2273#43679##### | CASE | HENRY | 3631712 |
| 2273266#5225### | CARDANO | JACK | 6325313 |
| 2273552#25423## | CASELLA | ALICE | 2265393 |
| 2274#5646###### | CASH | JOHN | 8311161 |
| 22742736#326435 | BARGARDO | DANIEL | 3314014 |
| 22742736#37422# | BARGARDO | ERICA | 3184015 |
| 2274278#567374# | CARHART | JOSEPH | 5152693 |
| 22743#7623782## | BARGE | ROBERTA | 5191695 |
| 2274336#635543# | CARIDEO | NELLIE | 8065141 |
| 2274346#5366384 | BASHEIN | KENNETH | 9752622 |
| 227455274#54554 | BARILLARI | LILLIAN | 2882010 |
| 22747266#367684 | BARISANO | DOROTHY | 5115531 |
| 2275#6288439### | CARL | MATTHEW | 6691825 |
| 227526#3676849# | CAPLAN | DOROTHY | 7232831 |
| 227537#34263### | CASLER | DIANE | 8664586 |
| 227537#726372## | CASLER | SANDRA | 4924587 |
| 227537#762378## | BARKER | ROBERT | 7651721 |
| 227546#3733#### | CARLIN | FRED | 3441770 |
| 22754833#782653 | CARKHUFF | STANLEY | 8213247 |
| 2275668786#7662 | CARLOMUSTO | RONALD | 2682389 |
| 227569#339273## | BARLOW | EDWARD | 4705113 |
| 227569#64243553 | BARLOW | MICHELLE | 5144633 |
| 22762#3532667## | BARNA | ELEANOR | 6612057 |
| 2276242626#8462 | CAPOBIANCO | VINCENT | 2945628 |
| 227626#6275363# | CARMAN | MARLENE | 5075848 |
| 227637#925837## | BARNES | WALTER | 6091314 |
| 227638253#2#### | CARNEVALE | C | 9013190 |
| 227638253#3275# | CARNEVALE | EARL | 2093762 |
| 227638253#36625 | CARNEVALE | DONALD | 4623763 |
| 2276388#24747## | BARNETT | CHRIS | 9911699 |
| 2276388#252378# | BARNETT | ALBERT | 3685609 |
| 227639#7384#### | CARNEY | SETH | 8894190 |
| 22765#3742##### | CAROL | ERIC | 5742731 |
| 22766#5472##### | AARON | LISA | 9465884 |
| 22766#64243553# | BARON | MICHELLE | 7955315 |
| 227663#336647## | BARONE | DENNIS | 5892330 |
| 227663#38769### | BARONE | ETROY | 4813226 |

Before proceeding to a step by step explanation of how the desired phone number is found and communicated to the caller, it is appropriate to explain the listing set forth above in terms of its comprising part of the data base utilized in practicing the present invention.

The first entry in the listing above is for Ronald Cameron. The numeric field in the first column of the listing is computed from the last name and first name of the entry. The numeric digits are the "Touch-tone" numeric equivalent of the letters of the last and first names. The equivalents are taken from the buttons of the "Touch-tone" pad - e.g. A, B, C=2; D, E, F=3; ... WXY=9. The letters Q and Z are assigned to the 7 and 9 digits respectively so that the buttons wound appear as PQRS and WXYZ respectively.

The numerics for the last name and first name are each terminated with a pound sign (#). In the example of CAMERON RONALD, the conversion resulted in the digits displayed, viz., 2263766#766253#. These numerics are used as the sequencing criteria for insertion into the data base. In this example it can be seen that the entry for CAMERON RONALD results in the lowest valued numeric equivalent in this portion of the telephone directory, so that this entry is the first one in the data base.

The second column in the list is the last name, e.g., CAMERON. The third column is the first name, e.g., RONALD. The fourth column is the telephone number which is read out in response to the caller's request for the phone listing of CAMERON RONALD.

The # character is considered by the computer sorting criteria to be lower valued than any of the numbers 2-9. Therefore, in the sequencing, names which are equal to but shorter than other names will appear first which is the convention observed in ordinary telephone books. An example of this is shown by the name CAMPBEL vs. the name CAMPBELL. The terminating # character of CAMPBEL is lower than the final L of CAMPBELL so that CAMPBEL occurs before CAMPBELL in the computer sorting criteria as is demonstrated in the list set forth above.

In the event of identical last names, the sorting will take place on the lower valued first names. An example of this is CASLER DIANE which sequences before CASLER SANDRA in the listing.

As discussed previously in this application, there may be "collisions" which occur when two different last names result in the same numeric string. An example of this is CASLER vs. BARKER, which both result in the numeric 227537. The computer software considers this collision as no different than the occurrence of multiple occurrences of CASLER which is also there exemplified. The only difference in the processing between a collision (CASLER vs. BARKER) and a duplicate (CASLER DIANE vs. CASLER SANDRA) is that the computer asks the caller to confirm the last name in the case of duplicate last names and then asks the caller to enter the first name so that it can differentiate between the duplicates. In the case of collisions, the computer asks for the first name without confirming the last name. In this case, the RO of ROBERT will differentiate the BARKER from the two CASLERS. At that time the computer will confirm the BARKER or the CASLER.

An important feature of the invention is that only rarely is it necessary for the caller to type the complete name in order to obtain the telephone number. It is because the computer scans the data base each time it receives an additional digit from the caller. It responds with the answer as soon as it "achieves unity".

Achieving unity means that there is one and only one numeric string that can be found in the data base that matches the caller's input numeric string. Unity is also achieved when the computer determines that the caller's input string will not match any string in the data base.

In this regard, one may note the name CASELLA ALICE in the listing. The "Touch-tone" numeric equivalent of CASELLA is seen in the listing to be 2273552. When a caller desires the listing for CASELLA, he will begin to enter the letters which would be received as 2273552 but after the computer receives 22735, it will sound an attention tone and deliver the number (226-5393) without the necessity of entering the last two digits (52). Inspection of the listing shows that 22735 is sufficient to differentiate this numeric string from the preceding one 2273266 (CARDANO) and the succeeding one 2274#(CASH). The computer software also determines that there is no duplicate CASELLA and there is no collision. Therefore, it does not request the first name (ALICE) but proceeds to deliver the number to the caller immediately.

If the received numeric string were to be, e.g., 22736, then unity would be achieved in the sense that the software recognizes that the string will not match any data base entry. In this case, the computer waits for the caller to enter the terminating # character, saves the erroneous string, and invokes error mode, a separate invention which is more properly the subject of a separate patent application.

There will be cases where the computer will require the entry of the terminating # and cases where it will not. Referring back to the example of CAMPBEL vs. CAMPBELL, after the receipt of the numeric string 2267235, the computer will not know whether this is the complete entry (CAMPBEL) or whether there is another digit (5) which has not yet been entered (CAMPBELL). When it recognizes this condition, it waits for a timeout period (e.g., five seconds). At the expiration of the timeout period, the computer asks the caller to enter a # if he is finished (CAMPBEL) or to continue entering data (CAMPBELL). Usually, the strings will become unique, that is, different from any others in the data base, before it is necessary to decide whether the terminating # is required.

The process of scanning the data base each time the caller enters an additional digit minimizes the number of digits required to uniquely identify an entry and frequently makes it unnecessary for the caller to enter the terminating # character except as described.

Referring again to the example of CAMERON, the data base requires seven scans to identify the listing. If each of these seven scans were to be literally performed, the consumption of disk reference time would be inordinate and tend to render the application impractical. The invention employs a "virtual data base scan" after receipt of each new letter until it determines that an actual data base read is required.

The process of a "virtual data base scan" is now described.

The computer RAM is allocated at system startup time such that there is an assigned line buffer 34 of a defined size that supports each telephone line accessing the computer. A practical buffer 34 will hold perhaps a thousand data base entries but for illustration, the buffer size is allocated so as to receive a maximum of 25 entries. Referring again to the sample list of names set forth above, the listings for CAMERON through BARBIERI would fit into a buffer of "size 25". The buffer capacity is available to the data base at data base update time and the update software uses the capacity figure (e.g. 25) to create the "filettes" discussed previously in this application.

Each filette 36 is a subdivision of the data base which is itself of a size such that it will fit completely into a line buffer. As the data base is updated (and as it is created initially) the filettes 36 are generated and their initial and final entries are saved for later entry into the on-line inquiry system. In this example, the first filette 36 would contain CAMERON through BARBIERI, the second would contain CARBONE through CARLOMUSTO. The twenty-fifth entry after CARBONE is BARLOW EDWARD but there is more than one BARLOW, so the filette is decreased in its number of entries so as not to end in a duplicate.

The first filette 36 has the beginning and ending last name numerics of 2263766# and 227243374# respectively. The second filette has the beginning and ending last name numerics of 2273663# and 2275669796# respectively, and so on for the division of the complete data base into filettes. When the data base update process is completed, the update software loads the beginning and ending numbers of all of the filettes into the computer RAM as an abbreviated version of the data base.

To give some idea of the number of filettes, the city of Wilmington, Del. would require its data base of approximately 300,000 listings to be subdivided into about 300 filettes of about 1000 listings each assuming a RAM buffer size of 100K bytes.

When the computer goes on-line to respond to listing data base queries, it consults the abbreviated data base after receipt of each new digit from the caller to determine whether it has received enough digits to read a particular filette. In the example, receipt of 226 would be sufficient to read the filette beginning with CAMERON as inspection of the listing indicates. Receipt of 2274 would signal the read of the filette beginning with CARBONE. The searching of the abbreviation file and the reading of a specific filette is the definition of a "virtual data base read".

It can be seen that the virtual data base read combined with the data base scan after receipt of each digit results in the minimum number of digits required to be entered by the caller and the actual physical read of the data base once and only once.

Other means can be employed to determine the size of the filettes 36. In addition to the requirement that a filette be smaller than a buffer 34, a requirement can be made that a filette begin with a new digit in a particular digit position. Referring to the listing page, the filette can be ended when the third most significant digit rolls over. In this example, the first filette can be terminated after CANTALUPI (226825874) and the next filette started with BARBATO (2272286). Then the digits comprising the abbreviated data base would be 226 meaning the beginning and ending of the first filette and 227 meaning the beginning and ending of the second filette.

The smaller the digit string is that indicates the boundaries of the filettes, the sooner the computer will be able to initiate the actual data base read. It is advantageous to initiate the actual data base read as soon as possible (minimum number of digits entered by the caller) so as to be able to overlap the delay in waiting for the data base read to begin responsive to, completion of the keying of new digits by the caller.

After the selected filette is loaded into the computer's RAM, it is economical to search the RAM buffer 34 after entry of each new digit by the caller. On the other hand, a small digit string identifying the filette boundaries results in less economical employment of the RAM. The optimum depends upon the value placed on minimizing the number of digits entered by the caller and upon the value placed on usage of the RAM buffers.

In practice, the means for updating the data base will attempt to maintain the filettes 36 at approximately 75% of the size of a RAM buffer so as to allow a filette to expand in size without becoming larger than the RAM buffer size. In the update procedure, the filette sizes are recognized, and if updating causes a filette to overflow beyond the assigned RAM buffer size, the filette must be resized downward to fit into the buffer. This will cause the succeeding filette to increase in size and possibly to "ripple" through the whole data base so as to cause the resizing of several or all of the filettes following the first overflow filette.

As the sizes of the line buffers increase, the size of the digit string required to identify the beginning and ending entries decreases.

For the example of Wilmington, Del., it is probably optimal to define a four digit string to identify the filette boundaries.

In the actual application, the listing data base records are of variable length rather than the fixed length as are illustrated here. Therefore, the RAM line buffer sizes are quoted in bytes instead of in number of records.

In practice, the virtual data base search procedure will examine the contents of all the line buffers to determine whether the desired filette is already in some RAM buffer. If so, the actual physical data base read will be eliminated. For the example of a city the size of Wilmington, Del., there would probably be about thirty-two buffers 34 and 300 filettes 36 so that there is an a priori probability of approximately 0.1 that a desired filette is already resident in some RAM buffer.

The RAM buffers are not dedicated to a particular line but rather "float" between lines as required. Additionally, a given RAM buffer may serve more than one line simultaneously.

In a highly simplified manner, FIG. 14 illustrates how the invention would operate in the event a call is made to the directory information number of a particular city. FIG. 14 illustrates, purely for the sake of facilitating ready understanding of the inventive concept, an arrangement in which filettes 1, 2, and 3 contain the names set forth on the list provided previously herein, beginning with "Cameron, Ronald" and ending with "Barone, Etroy". Thus filette number 1 would, as previously described herein, contain twenty-five names, with numeric strings 2263766#766253#CAMERON, RONALD to 22724374#945542#BARBIERI, WILLIAM; filette number 2 would contain numeric strings 2272663#4637###CARBONE, INES to 2275668786#7662 CARLOMUSTO, RONALD; and filette number 3 would contain numeric strings 227569#339273##BARLOW, EDWARD to 227663#38769###BARONE, ETROY. These numeric strings correspond to the names set forth on the list provided earlier in this application, beginning with 2263766#766253#, the numeric string for the name CAMERON, RONALD and so forth through the list.

As noted above, the example shown in FIG. 14 is an extremely simplified version of the invention, made simple solely to facilitate understanding. In actual practice, the filettes, and the contents thereof, would be as discussed in full detail previously in this application, in a typical city or other calling area. And, the listings instead of including only the first and last names as in the example list set forth above, would contain numeric strings including, perhaps, first and last names, middle initials, or middle names, if any, and full addresses.

In the example given, let it be assumed that the caller seeks the number of ALICE CASELLA. Upon dialing directory assistance, the call is answered, as shown in the schematic diagram at 38, by the computer. The computer, as shown at 40, asks the caller to spell the last name of the individual whose number is being requested, and asks the caller to do this, one key per letter (as per the concept set forth in my original application Ser. No. 595,788 filed Apr. 2, 1984, now U.S. Pat. No. 4,649,563).

As the caller proceeds to spell "Casella", the caller will depress the keys 32 as follows: "2", "2", etc.

Upon depression of each and every key, the computer interacts with the caller key by key and field by field (a "field" being, e.g., any numeric string ended by a # sign).

As the caller begins to spell out the last name, the computer is making an abbreviated data base search as indicated at 42 and previously discussed in full detail herein. In the abbreviated data base search, the computer begins to scan the data base each and every time a key is depressed. The name "Casella" contains seven numerics, and this would ordinarily require seven scans to identify the filette and its listing of "Casella". However, in the abbreviated search, the initial scan is of an abbreviated file to determine which single filette, as distinguished from all the other filettes, needs to be scanned to locate the requested listing.

In the present example, the entry of "227" narrows the search to filettes 1, 2, and 3. As soon as the next number, "3" is entered, the computer completes a "virtual" data search, i.e., the identification of filette number 2 as the only filette whose beginning and ending numerics encompass "2273". The proper filette (2) is now loaded into RAM. Immediately upon the entry of the next number, "5", the computer has completed its "actual" data base search and breaks in upon the caller without requirement of the caller spelling out the remaining letters of the name "Casella". The computer interacting key by key, does not require the entry of any additional letters, in accordance with the present invention, because there is no other listing that begins with the numbers "22735".

As a result, as shown at 44, after the caller has spelled out only "C-A-S-E-L" the computer asks the caller to confirm the entry. If the answer is "yes", the computer provides the number. Thus, this particular inquiry has resulted in the finding of a match for the input string of the last name. The computerized voice response "The number is 226-5393" is received by the caller and the processing of the inquiry is now complete. Unity has been achieved, in that a match was found for the numeric string keyed by the caller.

In a second example, had the caller sought the listing of "Cantalupi, Lee", keying of "C-A-N" (2-2-6) would have permitted the computer to locate and load the proper filette (No. 1). Then, with the keying of only the next letter, "T", the computer would go into the "provide listing" mode, because by interacting letter by letter it "achieves unity" due to the presence of one ad one only "2-2-6-8" grouping in its data base as numerics corresponding to the first four letters of a surname.

Let it be assumed, in a third example, that the caller was seeking the listing for an individual named "Casetta" from the Wilmington, Del., directory assistance facility. In this case, the numeric string for the surname would be 273882#. As the computer scans filette number 2 while the numbers are being keyed by the caller, as soon as the caller keys 22738, the computer will recognize that there is no surname listing that will correspond to the numeric string input by the caller. The caller thus continues to key the full surname, providing the numeric string 2273882#. There being no match in the numeric strings for surnames, the computer advises the caller that there is no listing, and invokes the error mode previously referred to herein.

If, as a third possibility, the computer finds, for example, two identical last names, it proceeds as is shown at 48, asking that the caller spell the first name. This would occur, for example, in filette number 2 if someone sought the listing for DANIEL BARGARDO. In this case, after the numeric string 22742736# has been input, the computer, finding two numeric strings corresponding to this input, requests the caller to spell the first name. In this case, the caller spelling "Daniel", first keys the number "3". Unity still has not been achieved, in view of the fact that the name "Erica" would also involve depression of the number "3". As soon as the caller spells the next letter, by depressing key "2", unity has been achieved, as shown at 50, again due to the interaction of the computer with the caller letter by letter. A match has been found, and without necessity the caller typing in the full first name "Daniel, the computer breaks in and advises that the number is 331-4014.

If on the other hand, the user is seeking a listing for a JOHN BARGARDO, after the caller has been requested to type the first name, the caller would depress the "5" key to start spelling "John". At this instant, the computer recognizes that there will be no listing corresponding to the numeric string input by the caller, and before the caller can complete the typing of the first name, the computer, having found no match, considers that unity has been achieved, and will invoke the error mode, involving advising the caller that there is no listing for that name, and providing the caller with further instructions by means in which the caller can seek additional assistance, including talking to an operator.

In the use of the invention, the # sign as a field-terminating character is important. It permits interaction of the computer with the caller field by field.

For example, let it be supposed that the caller seeks the number of "Baron, Michelle" from the exemplary directory listings set forth previously herein. By keying "22766#", the caller distinguishes this from the two "Barone" listings that immediately follow "Baron". In this way, there is interaction field-by-field.

At the same time, however, note from this example that a "collision" has developed with a listing of "Aaron, Lisa", since that also includes the surname string "22766#". The computer, as soon as the caller keys the # sign after typing "B-A-R-0-N", here requests the caller to key the first name. As soon as the caller keys "M" ("6" on the telephone key pad), listing" mode, first asking the caller to confirm that the number for Michelle Baron is being sought, and then (if an affirmative response is made by the caller) advising the caller of the number.

In the above example, let it be assumed that the caller, after typing "B-A-R-0-N", fails to add the # sign. The computer, recognizing that there are also listings for "Barone" that include "Baron" as a substring, requests the caller to continue typing the letters of the surname or alternatively, type a # sign to signal that typing of the surname has been completed. (see Case 4, FIG. 7).

In this way, it is seen how the computer interacts field by field as well as letter by letter, with the # sign playing an important part.

As previously stated herein, the schematic representation of FIG. 14 is a highly simplified illustration of the inventive concept. In actual practice, the number of filettes, and their content, can be far in excess of what has been described with respect to FIG. 14. For example, regional directories, covering a substantial number of cities or calling areas, can be put in place, with each filette listing beginning with the city, and including, in addition to the city or calling area, the individual's last name, first name and street address. The caller would be in this instance, upon reaching the directory assistance number, be asked to spell out the name of the city, then the individual's surname and if known, the individual's address. Of course, as soon as unity is achieved in the sense that a match is or is not found, the number is either given to the caller (usually without requirement of keying in the entire listing) or alternatively, if unity is achieved in the sense that no such listing exists, the procedures that are required when no match is found for the keyed numeric string, are invoked.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. The method of utilizing a telephone instrument having transmitter and receiver components, and further including a touch pad having individually depressable alpha-numeric keys each representing a single number and a plurality of letters of the alphabet, to obtain a desired piece of information in the form of a directory listing as a response to an inquiry for said directory listing generated at the sites of the instrument, that comprises the steps of:

(a) spelling out one or more words of the desired listing by a single depression, for each letter in a word, of only that key, and no others, that represents said letter;

(b) transmitting the alphabetically ordered inquiry, encoded as a numeric string containing individual numbers representing the respective individual letters, from the transmitter component of the instrument to a computer means, numeral by numeral;

(c) searching at the computer means, after each key depression, through a data base for a single complete piece of previously stored information in the form of a telephone directory listing, that will alone match the string of numbers entered up to that point to and including the last key depression of a key and notwithstanding the fact that said string may not yet be complete; and (d) immediately upon finding a match between a single complete piece of previously stored directory listing information and a string of numbers that may as yet be incomplete, providing the caller, by means of synthesized voice response, with said piece of information without awaiting alphabetic keying of the complete inquiry by the caller, said data base being subdivided into fillettes each of which contains a select group of listings in numeric string form.

2. The method of claim 1 wherein each filette begins with a numeric string dissimilar from a numeric string existing in any other filette.

3. The method of claim 1 wherein each filette ends with a numeric string dissimilar from a numeric string existing in any other filette.

4. The method of claim 1 wherein each numeric string of a filette includes at least one sequence of consecutively following numbers that correspond to letters provided on the keys of a telephone touch pad and when coded in alphabetic form will spell out at least one word.

5. The method of claim 1 wherein the step of searching the data base initially includes searching for the one filette that will contain the numeric string keyed by the caller.

6. The method of claim 5 further including restricting the search to a single filette, during the numeral-by-numeral keying of the inquiry, as soon as even a partial numeric string has been received that can be found only in that filette.

7. The method of claim 1 that further includes the steps of informing a caller, by synthesized voice response, in the event that an encoded numeric string seemingly entered as a complete alphabetical inquiry by the caller, is identical both to a complete numeric string on file in one of said filettes and also to part of another string also on file; and advising the caller by synthesized voice to either enter a distinguishing sign if the caller is satisfied that a complete inquiry has been entered or alternatively to continue entering data if the caller concludes that said inquiry is in fact incomplete.

8. The method of claim 7 wherein a "#" key on the telephone touch pad is used as said distinguishing sign.

* * * * *